(12) United States Patent
Bai et al.

(10) Patent No.: US 12,298,219 B2
(45) Date of Patent: May 13, 2025

(54) METHODS AND SYSTEMS FOR DETERMINING AN IDEAL DETECTOR GAIN

(71) Applicant: Becton, Dickinson and Company, Franklin Lakes, NJ (US)

(72) Inventors: Wenyu Bai, San Jose, CA (US); Yina Wang, San Jose, CA (US); Peter Mage, San Jose, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 292 days.

(21) Appl. No.: 18/115,554

(22) Filed: Feb. 28, 2023

(65) Prior Publication Data

US 2023/0296493 A1    Sep. 21, 2023

Related U.S. Application Data

(60) Provisional application No. 63/320,499, filed on Mar. 16, 2022.

(51) Int. Cl.
| | |
|---|---|
| *G01N 15/1429* | (2024.01) |
| *G01N 15/10* | (2024.01) |
| *G01N 15/1434* | (2024.01) |

(52) U.S. Cl.
CPC ..... *G01N 15/1429* (2013.01); *G01N 15/1434* (2013.01); *G01N 2015/1006* (2013.01)

(58) Field of Classification Search
CPC .......... G01N 15/1429; G01N 15/1434; G01N 2015/1006; G01N 15/149; G01N 15/1012; G01N 15/1425

USPC ........................................................ 356/338
See application file for complete search history.

(56) References Cited

U.S. PATENT DOCUMENTS

| | | | |
|---|---|---|---|
| 2020/0158621 A1 | 5/2020 | Shah et al. | |
| 2021/0293690 A1 | 9/2021 | Petersen et al. | |
| 2021/0325289 A1 | 10/2021 | Ilkov et al. | |
| 2021/0349005 A1 | 11/2021 | Bhaban et al. | |

OTHER PUBLICATIONS

Chase, et al. "Resolution of Dimly Fluorescent Particles: A Practical Measure of Fluorescence Sensitivity", Cytometry 33:267-279 (1998).
Maecker, et al., "Flow cytometry controls, instrument setup, and the determination of positivity", Cytometry Part A, 2006, vol. 69A, No. 9, pp. 1037-1042, p. 1038, left column, lines 11-15 and 29-33.
Perfetto, et al. "Quality assurance for polychromatic flow cytometry using a suite of calibration beads", Nat Protoc., Dec. 2012;7(12):2067-79.

*Primary Examiner* — Md M Rahman
(74) *Attorney, Agent, or Firm* — Bret E. Field; BOZICEVIC, FIELD & FRANCIS LLP

(57) ABSTRACT

Methods of determining an ideal gain for a detector in a light detection system of a flow cytometer are provided. Methods of interest include irradiating a flow stream with light from a light source, incrementally increasing the gain of the detector such that the detector collects light from the flow stream at each of a plurality of successively increasing gains, obtaining a baseline noise level from the detector at each gain in the plurality of successively increasing gains, calculating a limit of detection (LoD) for each gain in the plurality of successively increasing gains, and assessing the calculated LoDs to determine the ideal gain. Systems and computer readable storage media for practicing the invention are also provided.

19 Claims, 8 Drawing Sheets

METHODS AND SYSTEMS FOR DETERMINING AN IDEAL DETECTOR GAIN

CROSS-REFERENCE TO RELATED APPLICATION

Pursuant to 35 U.S.C. § 119 (e), this application claims priority to the filing dates of U.S. Provisional Patent Application Ser. No. 63/320,499 filed Mar. 16, 2022, the disclosure of which application is incorporated herein by reference in their entirety.

INTRODUCTION

The characterization of analytes in biological fluids has become an important part of biological research, medical diagnoses and assessments of overall health and wellness of a patient. Detecting analytes in biological fluids, such as human blood or blood derived products, can provide results that may play a role in determining a treatment protocol of a patient having a variety of disease conditions.

Flow cytometry is a technique used to characterize and often times sort biological material, such as cells of a blood sample or particles of interest in another type of biological or chemical sample. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. To characterize the components of the flow stream, the flow stream is irradiated with light. Variations in the materials in the flow stream, such as morphologies or the presence of fluorescent labels, may cause variations in the observed light and these variations allow for characterization and separation. To characterize the components in the flow stream, light must impinge on the flow stream and be collected. Light sources in flow cytometers can vary and may include one or more broad spectrum lamps, light emitting diodes as well as single wavelength lasers. The light source is aligned with the flow stream and an optical response from the illuminated particles is collected and quantified.

A flow cytometer includes a photo-detection system made up of the optics, detectors and electronics that enable efficient detection of optical signals and conversion thereof to corresponding electric signals. The electronic signals are processed to obtain parameters that a user can utilize to perform desired analysis. A flow cytometer includes different types of photodetectors to detect signals. When an optical signal (emerging from the sample being analyzed in the flow cytometer) is incident on the photodetectors, an electrical signal is produced at its output which is proportional to the incident optical signal. The gain of a photodetector is determined from the ratio of the output signal to the input signal. The gain of a photodetector can be used to control the operating range of detection by the photodetector, such as to ensure that sample fluorescence shows up in the operating range of the photodetector with a high degree of confidence. Typically, the gain of a photodetector is positively correlated to voltage such that the gain of the photodetector can be controlled by modulating the voltage applied to the photodetector. However, this correlation is complicated by numerous parameters including the type of the photodetector, wavelength of incident light as well as temperature.

The parameters measured using a flow cytometer typically include light at the excitation wavelength scattered by the particle in a narrow angle along a mostly forward direction, referred to as forward-scatter (FSC), the excitation light that is scattered by the particle in an orthogonal direction to the excitation laser, referred to as side-scatter (SSC), and the light emitted from fluorescent molecules in one or more detectors that measure signal over a range of spectral wavelengths, or by the fluorescent dye that is primarily detected in that specific detector or array of detectors. Different cell types can be identified by their light scatter characteristics and fluorescence emissions resulting from labeling various cell proteins or other constituents with fluorescent dye-labeled antibodies or other fluorescent probes.

Flow cytometers may further comprise means for recording the measured data and analyzing the data. For example, data storage and analysis may be carried out using a computer connected to the detection electronics. For example, the data can be stored in tabular form, where each row corresponds to data for one particle, and the columns correspond to each of the measured features. The use of standard file formats, such as an "FCS" file format, for storing data from a particle analyzer facilitates analyzing data using separate programs and/or machines. Using current analysis methods, the data typically are displayed in 1-dimensional histograms or 2-dimensional (2D) plots for ease of visualization, but other methods may be used to visualize multidimensional data.

A frequent goal of flow cytometric analysis is to classify different populations of flow cytometer data as being associated with one or more different parameters. This classification is impacted by how well different populations of flow cytometer data are separated. The degree of separation between two populations is determined by their mean or median difference as well as their spreads. While mean differences between populations of flow cytometer data received from a stained sample are already defined, users can adjust the gain of each detector to reduce the spread of the populations, thereby achieving better separation among different populations.

Conventional approaches to determining detector gains often involve a voltration process (i.e., "voltage titration"). Voltration generally involves analyzing single-stained fluorescent beads or stained cells with a series of different voltage settings. The resulting flow cytometer data may subsequently be plotted against the different voltages. This method may be used to obtain resolution of fluorescent signal from background noise and autofluorescence. Additional conventional approaches employ broad-spectrum fluorescent beads as a surrogate for typical samples. It is typically assumed that gains determined to be optimal for the broad-spectrum beads will work for most samples, or will at least provide a suitable starting gain that may subsequently be adjusted. However, the bead approach still requires a voltration process for each instrument having a different optical configuration and for samples with significant differences. Previous approaches for determining detector gain may be found in, for example, Maecker H T and Trotter J (2006) *Cytometry A* 69:1037-1042; herein incorporated by reference in its entirety.

SUMMARY

The present inventors have realized that conventional approaches to gain setup, while effective in some cases, are often time-consuming and present a burden to practitioners of flow cytometry. In particular, the inventors determined that a key challenge in finding optimal gains is that gains are sample-dependent. This is because optimal gain depends on the optical background in the sample fluid, which can vary depending on the dyes in the sample as well as the particular staining/cleaning protocol that is employed. As such, methods and systems for determining gains that take into account sample-specific information and reduce fluorochrome spread are desirable. Embodiments of the present invention satisfy this desire.

Aspects of the invention include methods of determining an ideal gain for a detector in a light detection system of a flow cytometer. Methods of interest include irradiating a flow stream (e.g., containing buffer, water, particles, or combinations thereof) with light from a light source, incrementally increasing the gain of the detector such that the detector collects light from the flow stream at each of a plurality of successively increasing gains, obtaining a baseline noise level from the detector at each gain in the plurality of successively increasing gains, calculating a limit of detection (LoD) for each gain in the plurality of successively increasing gains, and assessing the calculated LoDs to determine the ideal gain. Gains may be calculated for any convenient detector or set of detectors. Detectors of interest include, for example, avalanche photodiodes (APDs) photomultiplier tubes (PMTs), photodiodes (PDs) and silicon photomultipliers (SiPMs). The LoDs described herein are calculated based on the gain and the baseline noise level. For example, in certain cases, calculating the LoD comprises generating a ratio between the gain and the baseline noise level. In some instances, calculating the LoD additionally comprises taking the inverse of the ratio between the gain and the baseline noise level. In embodiments, assessing the calculated LoDs comprises producing an LoD curve comprising the LoDs calculated for each gain in the plurality of successively increasing gains and, e.g., evaluating the LoD curve for the presence of an inflection point. In versions, assessing the calculated LoDs includes identifying an inflection point in the LoD curve as well as a gain in the plurality of successively increasing gains associated with the LoD at the inflection point. Methods may additionally include determining that the gain in the plurality of successively increasing gains associated with the LoD at the inflection point is the ideal gain.

In some cases, methods of interest include assessing flow cytometer data associated with a plurality of different particle populations to determine the ideal gain. In some such cases, the plurality of particle populations comprises a first particle population that is negative for a particular parameter and a second particle population that is positive for the same parameter. Methods may, in some embodiments, include acquiring a first and a second signal magnitude for each of the first and second particle populations, respectively, at each gain in the plurality of successively increasing gains. For example, embodiments include estimating the first signal magnitude based on the baseline noise level obtained by the detector at each gain in the plurality of successively increasing gains. In additional cases, methods include estimating the second signal magnitude based on each gain in the plurality of successively increasing gains. Versions of the subject methods also include acquiring the first and/or second signal magnitudes from the detector. In certain instances, methods include calculating a difference between the second and first signal magnitudes acquired at each gain in the plurality of successively increasing gains. Methods may also include generating a linearity scale for evaluating how the difference between the second and first signal magnitudes increases with increasing detector gain and identifying a point of non-linearity at which the difference between the second and first signal magnitudes does not increase linearly with increasing detector gain. Methods may subsequently include determining a gain that is lower than the gain associated with the point of non-linearity to be the ideal gain. Following the determination of the ideal gain, embodiments of the method include terminating the incremental gain increase.

In some instances, methods additionally include setting an event rate by selecting the sensitivity with which a trigger sensor observes the presence of a particle and produces a trigger signal. In such instances, methods may include setting the gain of the trigger sensor. The trigger sensor may be selected from, for example, a forward-scattered light sensor and an axial light loss (ALL) channel sensor. Embodiments of the method also include calculating a trigger window based on the trigger signal and obtaining the baseline noise level at time periods that are outside of the trigger window. The subject trigger window provides a time period during which the particle is expected to pass through a detection zone of the detector.

Aspects of the invention additionally include systems (e.g., flow cytometers). Systems of interest include a flow cell configured to transport a flow stream (e.g., containing buffer, water, particles, or combinations thereof), a light source for irradiating the flow stream at an interrogation point, a detector configured to collect light from the flow stream, and a processor operably connected to the detector. Processors of interest are configured to perform the subject methods and incrementally increase the gain of the detector such that the detector collects light from the flow stream at each of a plurality of successively increasing gains, obtain a baseline noise level from the detector at each gain in the plurality of successively increasing gains, calculate an LoD for each gain in the plurality of successively increasing gains, and assess the calculated LoDs to determine an ideal gain.

Aspects of the invention additionally include non-transitory computer readable storage media comprising instructions stored thereon for determining an ideal gain for a detector in a light detection system of a flow cytometer. The subject instructions involve incrementally increasing the gain of the detector such that the detector collects light from particles in a flow stream (e.g., containing buffer, water, particles, or combinations thereof) at each of a plurality of successively increasing gains, obtaining a baseline noise level from the detector at each gain in the plurality of successively increasing gains, calculating an LoD for each gain in the plurality of successively increasing gains, and assessing the calculated LoDs to determine the ideal gain.

BRIEF DESCRIPTION OF THE FIGURES

The invention may be best understood from the following detailed description when read in conjunction with the accompanying drawings. Included in the drawings are the following figures.

DETAILED DESCRIPTION

Figure 1:
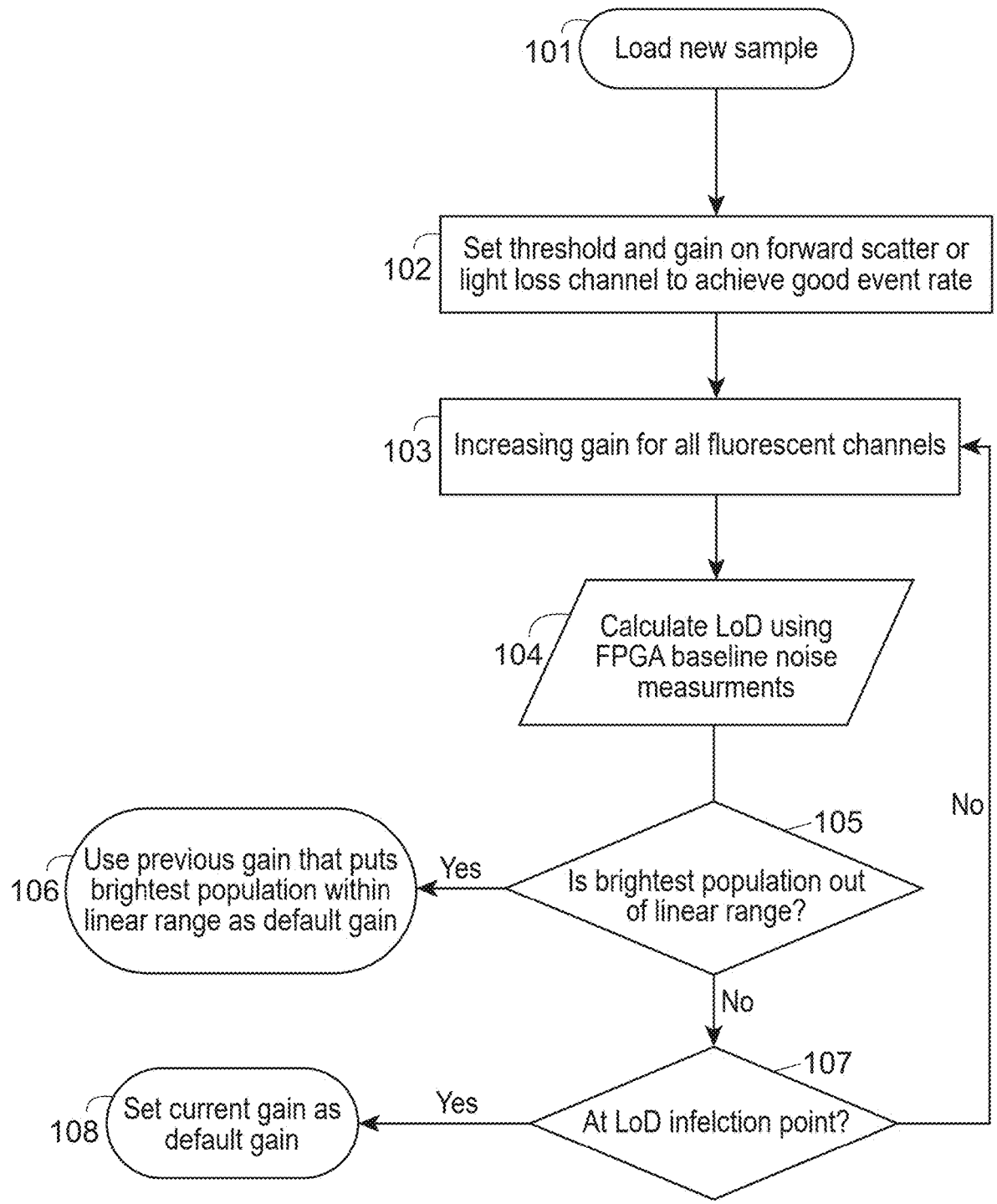
FIG. 1 presents a flowchart depicting the workflow for determining an ideal gain according to certain embodiments.

Methods of determining an ideal gain for a detector in a light detection system of a flow cytometer are provided. Methods of interest include irradiating a flow stream with light from a light source, incrementally increasing the gain of the detector such that the detector collects light from the flow stream at each of a plurality of successively increasing gains, obtaining a baseline noise level from the detector at each gain in the plurality of successively increasing gains, calculating a limit of detection (LoD) for each gain in the plurality of successively increasing gains, and assessing the calculated LoDs to determine the ideal gain. Systems and computer readable storage media for practicing the invention are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the system and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Methods of Determining an Ideal Gain for a Detector

As discussed above, aspects of the invention include methods of determining an ideal gain for a detector in a light detection system of a flow cytometer. Methods of interest include irradiating particles in a flow stream with light from a light source, incrementally increasing the gain of the detector such that the detector collects light from the flow stream at each of a plurality of successively increasing gains, obtaining a baseline noise level from the detector at each gain in the plurality of successively increasing gains, calculating a limit of detection (LoD) for each gain in the plurality of successively increasing gains, and assessing the calculated LoDs to determine the ideal gain.

"Ideal gain" refers to a gain that optimizes the signal-to-noise ratio (SNR) for a given detector. The subject ideal gain is determined using the relative magnitudes of gain-dependent noise and gain independent noise. By "gain-dependent" noise, it is meant noise having a magnitude that is proportional to the magnitude of the gain. Examples of gain-dependent noise include optical background noise. By "gain-independent" noise, it is meant noise that does not vary with the magnitude of the gain. In general, gains should be set up such that the gain-independent noise is negligible compared to the magnitude of gain-dependent noise. Beyond this point, the noise will increase with the gain at a rate at least the same as the signal so that the SNR will not be improved. Accordingly, in embodiments, ideal gain can be found by tracing how SNR changes with the gain and maximizing the SNR (e.g., via a robust peak-finding algorithm). To accomplish this, aspects of the method include acquiring the magnitudes of the signal and the noise, or providing estimations thereof. The fact that the signal is proportional to the gain makes it possible to use gain itself to represent the signal magnitude. As such, versions of the invention include employing gain as a surrogate for signal magnitude. In addition, embodiments of the method include employing baseline noise to surrogate the noise of the dimmest population of flow cytometer data. In certain embodiments, the subject methods provide for an increased signal-to-noise ratio of the light detection system, such as where the signal-to-noise ratio of the light detection system is increased by 5% or more, such as by 10% or more, such as by 25% or more, such as by 50% or more, such as by 75% or more, such as by 90% or more and including by 99% or more, e.g., as compared to a suitable control. In certain instances, the subject methods increase the signal-to-noise ratio by 2-fold or more, such as by 3-fold or more, such as by 4-fold or more, such as by 5-fold or more and including by 10-fold or more, e.g., as compared to a suitable control. In certain embodiments, methods of the present disclosure are sufficient to broaden the range of intensity detection and quantitation by 2 fold or greater, such as by 3 fold or greater, such as by 5 fold or greater, such as by 10 fold or greater, such as by 25 fold or greater, such as by 50 fold or greater and including by 100 fold or greater, e.g., as compared to a suitable control.

While the present invention includes determining ideal gains that optimize the data quality in raw space (i.e., detector space) having a number of dimensions equal to the number of detectors in the instrument, there is also a strong correlation between the SNRs of detector measurements and the spread of fluorophore abundance in "compensated space" or "unmixed space" having a number of dimensions equal to the number of fluorochromes in the sample. Compensated or unmixed data is produced through the mathematical process of fluorescence compensation (in conventional cytometers) or spectral unmixing (in full-spectrum cytometers). Methods for spectral mixing include, for example, weighted-least-squares (WLS) based spectral unmixing and ordinary-least-squares (OLS) based spectral unmixing and are described in, e.g., U.S. Patent Application Publication No. 2020/0302606; the disclosure of which is incorporated by reference herein. In particular, for WLS-based spectral unmixing, the minimization of detector SNRs results in minimal fluorophore spreads. In the case of using the OLS algorithm for unmixing, the direct proportionality relationship between detector SNRs and fluorophore spreads is hindered by the fact that the heteroscedasticity of detector measurements violates the OLS requirements that the measurements be homoscedastic. However, it is generally true that the SNRs of the upstream measurements should be in a reasonable range to ensure the downstream data quality. Therefore, carrying out embodiments of the present methods results in the reduction and/or minimization of fluorophore spreads.

In some cases, methods of interest are sample-specific. In other words, a set of ideal gains are determined with respect to a given particulate sample. The ideal gains may subsequently be associated with that particulate sample, e.g., in the form of tube target values (TTVs). TTVs are associated with the voltage of each detector and therefore, the brightness of the positive population for each fluorescence parameter. In other words, if the relevant sample having TTVs produced as discussed herein is analyzed in the flow stream of the instrument on which those TTVs were obtained, the ideal gains may be applied to the detectors in that instrument such that SNRs are improved and/or fluorophore spread is decreased.

As discussed above, methods of interest include irradiating particles in a flow stream with light from a light source. By "particles", it is meant any particulate matter that may be transported in a flow stream. Particles of interest include, but are not limited to, cells, beads, polypeptides, polynucleotides, combinations thereof, and the like. The subject particles may be of any suitable size and, in some embodiments, range from less than 1 μm to 20 μm in diameter. The "flow stream" discussed herein is referred to in its conventional sense to describe a sheath fluid stream in which particles are transported through a flow cell. In some embodiments, particles are transported in a core stream, i.e., a portion of the flow stream in which the particles are transported in a single-file manner. Core stream diameter may be adjusted in proportion to the pressure applied to the particles as they are injected into the sheath fluid stream. The flow rate of the sheath fluid remains constant. In this manner, particles are injected into the sheath fluid and hydrodynamically focused such that laminar flow is generated and the particles travel along the same axis at approximately the same rate. The flow stream may include a liquid sample injected from a sample tube. In some embodiments, the flow stream includes a buffer. In certain aspects, the flow stream includes water. In certain embodiments, the flow stream may include a narrow, rapidly flowing stream of liquid that is arranged such that linearly segregated particles transported therein are separated from each other in a single-file manner. In alternative embodiments, the flow stream does not include particles and only includes sheath fluid (e.g., buffer, water).

In some cases, methods include transporting particles through a flow cell. A "flow cell" is described herein in its conventional sense to refer to a component containing a flow channel having a liquid flow stream for transporting particles in a sheath fluid. In embodiments, the subject flow cell includes a cuvette. Cuvettes of interest include containers having a passage running therethrough. The flow stream may include a liquid sample injected from a sample tube. Flow cells of interest include a light-accessible flow channel. In some instances, the flow cell includes transparent material (e.g., quartz) that permits the passage of light therethrough. Any convenient flow cell which propagates a fluidic sample to a sample interrogation region may be employed as the flow cell described herein, where in some embodiments, the flow cell includes is a cylindrical flow cell, a frustoconical flow cell or a flow cell that includes a proximal cylindrical portion defining a longitudinal axis and a distal frustoconical portion which terminates in a flat surface having the orifice that is transverse to the longitudinal axis.

In practicing methods according to certain embodiments, a sample (e.g., in a flow stream of a flow cytometer) is irradiated with light from a light source. Any convenient light source may be employed. In some instances, methods include the irradiation of a flow cell with a laser. In some embodiments, methods include the irradiation of the flow cell with a plurality of light sources (e.g., lasers). In certain embodiments, the laser may be any convenient laser, such as a continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chloride (XeCl) excimer laser or xenon-fluorine (XeF) excimer laser or a combination thereof. In other instances, lasers for practicing the subject methods include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, lasers for practicing the subject methods include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

In some embodiments, the methods include irradiating the particle in the flow stream with a continuous wave light source, such as where the light source provides uninterrupted light flux and maintains irradiation of particles in the flow stream with little to no undesired changes in light intensity. In some embodiments, the continuous light source emits non-pulsed or non-stroboscopic irradiation. In certain embodiments, the continuous light source provides for substantially constant emitted light intensity. For instance, methods may include irradiating the particle in the flow stream with a continuous light source that provides for emitted light intensity during a time interval of irradiation that varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.01% or less, such as by 0.001% or less, such as by 0.0001% or less, such as by 0.00001% or less and including where the emitted light intensity during a time interval of irradiation varies by 0.000001% or less. The intensity of light output can be measured with any convenient protocol, including but not limited to, a scanning slit profiler, a charge coupled device (CCD, such as an intensified charge coupled device, ICCD), a positioning sensor, power sensor (e.g., a thermopile power sensor), optical power sensor, energy meter, digital laser photometer, a laser diode detector, among other types of photodetectors.

In other embodiments, the methods include irradiating the particle propagating through the flow stream with a pulsed light source, such as where light is emitted at predetermined time intervals, each time interval having a predetermined irradiation duration (i.e., pulse width). In certain embodiments, methods include irradiating the particle with the pulsed light source in each interrogation region of the flow stream with periodic flashes of light. For example, the frequency of each light pulse may be 0.0001 kHz or greater, such as 0.0005 kHz or greater, such as 0.001 kHz or greater, such as 0.005 kHz or greater, such as 0.01 kHz or greater, such as 0.05 kHz or greater, such as 0.1 kHz or greater, such as 0.5 kHz or greater, such as 1 kHz or greater, such as 2.5 kHz or greater, such as 5 kHz or greater, such as 10 kHz or greater, such as 25 kHz or greater, such as 50 kHz or greater and including 100 kHz or greater. In certain instances, the frequency of pulsed irradiation by the light source ranges from 0.00001 kHz to 1000 kHz, such as from 0.00005 kHz to 900 kHz, such as from 0.0001 kHz to 800 kHz, such as from 0.0005 kHz to 700 kHz, such as from 0.001 kHz to 600 kHz, such as from 0.005 kHz to 500 kHz, such as from 0.01 kHz to 400 kHz, such as from 0.05 kHz to 300 kHz, such as from 0.1 kHz to 200 kHz and including from 1 kHz to 100 kHz. The duration of light irradiation for each light pulse (i.e., pulse width) may vary and may be 0.000001 ms or more, such as 0.000005 ms or more, such as 0.00001 ms or more, such as 0.00005 ms or more, such as 0.0001 ms or more, such as 0.0005 ms or more, such as 0.001 ms or more, such as 0.005 ms or more, such as 0.01 ms or more, such as 0.05 ms or more, such as 0.1 ms or more, such as 0.5 ms or more, such as 1 ms or more, such as 2 ms or more, such as 3 ms or more, such as 4 ms or more, such as 5 ms or more, such as 10 ms or more, such as 25 ms or more, such as 50 ms or more, such as 100 ms or more and including 500 ms or more. For example, the duration of light irradiation may range from 0.000001 ms to 1000 ms, such as from 0.000005 ms to 950 ms, such as from 0.00001 ms to 900 ms, such as from 0.00005 ms to 850 ms, such as from 0.0001 ms to 800 ms, such as from 0.0005 ms to 750 ms, such as from 0.001 ms to 700 ms, such as from 0.005 ms to 650 ms, such as from 0.01 ms to 600 ms, such as from 0.05 ms to 550 ms, such as from 0.1 ms to 500 ms, such as from 0.5 ms to 450 ms, such as from 1 ms to 400 ms, such as from 5 ms to 350 ms and including from 10 ms to 300 ms.

In some embodiments, the light source outputs a specific wavelength such as from 200 nm to 1500 nm, such as from 250 nm to 1250 nm, such as from 300 nm to 1000 nm, such as from 350 nm to 900 nm and including from 400 nm to 800 nm. In certain embodiments, the continuous wave light source emits light having a wavelength of 365 nm, 385 nm, 405 nm, 460 nm, 490 nm, 525 nm, 550 nm, 580 nm, 635 nm, 660 nm, 740 nm, 770 nm or 850 nm.

The flow stream may be irradiated by the light source from any suitable distance, such as at a distance of 0.001 mm or more, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as mm or more and including at a distance of 100 mm or more. In addition, irradiation of the flow stream may be at any suitable angle such as at an angle ranging from 10° to 90°, such as from 15° to 85°, such as from 20° to 80°, such as from 25° to 75° and including from 30° to 60°, for example at a 90° angle.

Following irradiation by the light source, particles emit particle-modulated light. By "particle-modulated light", it is meant light that is emitted by the particles in the flow stream following the irradiation of the particles with light from the light source. In some cases, the particle-modulated light is fluorescent light. Fluorescent light may, for example, be emitted by a particle having a fluorochrome after said fluorochrome is irradiated with excitation wavelength light. In other cases, the particle-modulated light is side-scattered light. As discussed herein, side-scattered light refers to light refracted and reflected from the surfaces and internal structures of the particle. In still other cases, the particle-modulated light includes both fluorescent light and side-scattered light. In additional embodiments, the particle-modulated light includes forward-scattered light (i.e., light that travels through or around the particle in mostly a forward direction).

Methods of the present disclosure also include detecting light with a detector. Detectors for practicing the subject methods may be any convenient light detector, including but not limited to photosensors or photodetectors, such as active-pixel sensors (APSs), quadrant photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes (PDs), photomultiplier tubes (PMTs), phototransistors, quantum dot photoconductors or avalanche photodiodes (APDs), silicon photomultipliers (SiPMs), and combinations thereof, among other photodetectors. In certain embodiments, the photodetector is a photomultiplier tube, such as a photomultiplier tube having an active detecting surface area of each region that ranges from 0.01 cm² to 10 cm², such as from 0.05 cm² to 9 cm², such as from, such as from 0.1 cm² to 8 cm², such as from 0.5 cm² to 7 cm² and including from 1 cm² to 5 cm². In other embodiments, the photodetector is an avalanche photodiode, such as an avalanche photodiode an active detecting surface area of each region that ranges from 0.01 cm² to 10 cm², such as from 0.05 cm² to 9 cm², such as from, such as from 0.1 cm² to 8 cm², such as from 0.5 cm² to 7 cm² and including from 1 cm² to 5 cm². In some instances, light is detected by an array of photodetectors, such as a photodetector array having 2 photodetectors or more, such as 3 photodetectors or more, such as 5 photodetectors or more, such as 10 photodetectors or more, such as 25 photodetectors or more, such as 50 photodetectors or more, such as 75 photodetectors or more, such as 100 photodetectors or more, such as 500 photodetectors or more and including a photodetector array having 1000 photodetectors or more. In certain instances, light is detected by an array of avalanche photodiodes such as a photodetector array having 2 avalanche photodiodes or more, such as 3 avalanche photodiodes or more, such as 5 avalanche photodiodes or more, such as 10 avalanche photodiodes or more, such as 25 avalanche photodiodes or more, such as 50 avalanche photodiodes or more, such as 75 avalanche photodiodes or more, such as 100 avalanche photodiodes or more, such as 500 avalanche photodiodes or more and including a photodetector array having 1000 avalanche photodiodes or more.

In embodiments of the present disclosure, light may be measured by the detector at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light from particles in the flow stream at 400 or more different wavelengths.

In embodiments, light may be measured continuously or in discrete intervals. In some instances, detectors of interest are configured to take measurements of the light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the light from the light source may be taken one or more times during each discrete time interval, such as 2 or more times, such as 3 or more times, such as 5 or more times and including 10 or more times. In certain embodiments, the light from the light source is measured by the detector 2 or more times, with the data in certain instances being averaged.

Obtaining data signals from the detector, in certain embodiments, includes calculating a signal amplitude over the period of time. In some instances, calculating the signal amplitude includes calculating the median signal amplitude. In certain instances, methods also include comparing the calculated signal amplitude with the light intensity of the light source. In other instances, the methods include calculating the mean signal amplitude. In some instances, methods include also calculating the standard deviation of the signal amplitude. In other instances, methods include calculating the variance and coefficient of variation (e.g., CV=standard deviation/mean) of the signal amplitude. Based on one or more of the calculated signal amplitude and the comparison between the calculated signal amplitude with the light intensity of the light source, a parameter of the detector is calculated. For instance, methods may include determining for the detector a parameter such as minimum detection threshold, maximal detection threshold, detector sensitivity (i.e., ratio of detector output to detector input), detector dynamic range (range of detector signal from minimum to maximal detection thresholds), detector signal-to-noise ratio or number of photoelectrons per unit output.

In certain cases, the method comprises setting an event rate by selecting the sensitivity with which a trigger sensor observes the presence of a particle and produces a trigger signal. In other words, a higher trigger sensor sensitivity will result in more particles being observed and therefore a higher event rate, while a lower trigger sensor sensitivity will result in comparatively fewer particles being observed and therefore a comparatively lower event rate. A "trigger sensor" is a photodetector (such as those described above) configured to detect the presence of a particle in the flow stream. The trigger sensor may any suitable sensor in the light detection system. For example, in some cases, the trigger sensor is a forward-scattered light sensor (e.g., a sensor positioned to detect light that passes through the sample in a mostly forward direction). In additional cases, the trigger sensor is an axial light loss (ALL) channel sensor (e.g., a sensor positioned to measure total light lost from the light source at 0 degrees when a particle passes through said light). As such, a "trigger signal" is associated with a time point at which a given particle is detected in the flow stream. An "event rate" is generally measured in particles per unit time (e.g., seconds). The sensitivity with which the trigger sensor observes the presence of a particle and produces a trigger signal may be selected to produce any convenient event rate. Event rates of interest range, for example from 1 particle/sec to 500,000 particles/sec, such as 25 particles/sec to 100,000 particles/sec, such as 50 particles/sec to 50,000 particles/sec, and including 100 particles/sec to 15,000 particles/sec. In select embodiments, the event rate is less than 50,000 particles/sec, including less than 15,000 particles/sec. In some cases, selecting the sensitivity with which a trigger sensor observes the presence of a particle and produces a trigger signal includes setting the gain of the trigger sensor. The trigger sensor gain may be set, e.g., by a user practicing the subject methods in order to achieve a certain event rate.

As discussed above, aspects of the invention also include incrementally increasing the gain of the detector such that the detector collects light from the flow stream at each of a plurality of successively increasing gains. By "incrementally increasing" the gain, it is meant operating the detector at a first gain, increasing the first gain by a certain amount and subsequently operating the detector at a second gain, increasing the second gain by a certain amount and subsequently operating the gain at a third gain, and so on. This process may be referred to as "sweeping" the detector gain. By "successively increasing" gains, it is meant that each gain in the series of gains possesses a higher magnitude than the gain immediately preceding it in the series. In other words, gains do not decrease over time. In certain cases, incrementally increasing the gains includes increasing the voltages applied to the detectors. Depending on the type of detector (e.g., photomultiplier tube, avalanche photodiode, etc.), the applied voltages may be increased by 0.001% or more, such as by 0.005% or more, such as by 0.01% or more, such as by 0.05% or more, such as by 0.1% or more, such as by 0.5% or more, such as by 1% or more, such as by 2% or more, such as by 3% or more, such as by 4% or more, such as by 5% or more, such as by 10% or more, such as by 15% or more, such as by 25% or more and including in increasing increments of by 50% or more. In certain instances, the applied voltage is increased by 2-fold or more, such as by 3-fold or more, such as by 5-fold or more and including by 10-fold or more. In some embodiments, the voltage applied to each photodetector in the subject methods is increased by 0.0001 mV or more, such as by 0.0005 mV or more, such as by 0.001 mV or more, such as by 0.005 mV or more, such as by 0.01 mV or more, such as by 0.05 mV or more, such as by 0.1 mV or more, such as by 0.5 mV or more, such as by 1 mV or more, such as by 2 mV or more, such as by 3 mV or more, such as by 4 mV or more, such as by 5 mV or more, such as by 10 mV or more, such as by 25 mV or more, such as by 50 mV or more, such as by 75 mV or more, such as by 100 mV or more, such as by 250 mV or more, such as by 500 mV or more, such as by 750 mV or more, such as by 1000 mV or more, such as by 2500 mV or more, such as 5000 mV or more and including by 10000 mV or more. Each increment in the plurality of successively increasing gains may either be the same or different. In some embodiments, each increment in the plurality of successively increasing gains has the same magnitude (i.e., the gain is increased by the same amount in each case). In other embodiments, the gain may be increased by increments of differing sizes.

Methods of interest additionally include obtaining a baseline noise level from the detector at each gain in the plurality of successively increasing gains. The term "baseline noise" is used herein in its conventional sense to refer to the baseline electronic signals from the detector (e.g., electronic signals that originate from the operating electronic components of the detector or optical components of the light detection system). In certain instances, baseline noise includes electronic signals present in the light detection system, such as those generated by a light source or other electronic sub-components of the system. In other embodiments, the baseline noise includes electronic signals that result from vibrational or thermal effects from components of the system. In yet other embodiments, baseline noise includes optical signals, such as light from an irradiation source in the system (e.g., from one or more lasers present in a flow cytometer). In certain cases, baseline noise arises from a combination of zero-mean electronic thermal noise (i.e., electrical background) as well as photonic shot noise arising from, e.g., ambient light and/or elastically scattered light (i.e., optical background). Obtaining real-time, sample-specific measurements of the baseline noise according to embodiments of the present disclosure provide for determining contributions to background noise of each individual detector in a light detection system, such as contributions from time-varying parameters which include, but are not limited to, drift in laser focus, drift in laser alignment, time-dependent changes in flow rate and flow profile of the flow stream, as well as increases in electronic noise due to thermal drift of detector components such as transimpedance amplifiers. In certain cases, baseline noise is associated with sample fluid characteristics (e.g., the amount of dye in the sample). Baseline noise may be calculated via any convenient protocol. For example, baseline noise can be defined as the mean-squared error of the detector signal in the absence of particle-based signals or "events". In some embodiments, obtaining baseline noise includes calculating a moving average mean squared error of the generated data signals to determine the baseline noise of the photodetector. Exemplary protocols may be found in U.S. application Ser. No. 17/403,105; the disclosure of which is herein incorporated by reference in its entirety.

As discussed above, some embodiments of the method include setting an event rate by selecting the sensitivity with which a trigger sensor observes the presence of a particle and produces a trigger signal. In certain cases, such embodiments may additionally include calculating a trigger window based on the trigger signal. By "trigger window", it is meant a time period during which the particle is expected to pass through a detection zone of the detector (e.g., laser). The "detection zone" is a region of the flow cell from which the detector collects light. Following the calculation of the trigger window, versions of the method include obtaining the baseline noise level at time periods that are outside of the trigger window. In other words, in cases where baseline noise is associated with signals that are unrelated to particles, embodiments of the method include obtaining baseline noise from a detector at time points during which a particle is not being evaluated by said detector (i.e., outside of the trigger window). In certain cases, baseline noise is obtained from a field programmable gate array (FPGA) having a measurement block. In such cases, the FPGA continuously monitors baseline noise outside of the trigger window.

Methods of the disclosure further involve calculating a limit of detection (LoD) for each gain in the plurality of successively increasing gains. As discussed herein, an LoD refers to the smallest measurable particle-modulated light signal that can be observed with a sufficient degree of confidence or statistical significance. In some instances, the LoD represents the smallest measurable particle-modulated light signal corresponding to one standard deviation of noise. LoDs of interest are calculated based on the gain and the baseline noise level (e.g., obtained as discussed above). For example, in certain cases, calculating the LoD comprises generating a ratio between the gain and the baseline noise level. The fact that the particle-modulated light signal is proportional to gain makes it possible to use the gain itself to represent the signal magnitude. In addition, baseline noise surrogates the noise of the dimmest population of particles. This is strictly true when autofluorescence is low and marker expression is zero, and sufficiently true for the purposes of the subject methods even when these conditions are not met. Because the gain and baseline noise level surrogate the signal and noise, respectively, generating a ratio between the gain and the baseline noise level surrogates a signal-to-noise ratio (SNR) for a given detector. As such, LoD and SNR may be thought of as identical mathematical constructs in the framework of the present invention. In certain cases, calculating the LoD comprises taking the inverse of the ratio between the gain and the baseline noise level.

In certain versions, assessing the calculated LoDs includes producing an LoD curve comprising the LoDs calculated for each gain in the plurality of successively increasing gains. In other words, LoDs calculated at each gain are plotted as a function of gain. In some cases, following the calculation of each individual LoD, that LoD is added as a data point on the LoD curve. Embodiments of the methods also include evaluating the LoD curve for the presence of an inflection point (i.e., a point at which the concavity of the curve changes). In instances where the LoD curve includes an inflection point, methods may include identifying the inflection point in the LoD curve as well as a gain in the plurality of successively increasing gains associated with the LoD at the inflection point. In some instances, methods include determining that the gain in the plurality of successively increasing gains associated with the LoD at the inflection point is the ideal gain.

In further embodiments, methods include assessing flow cytometer data associated with a plurality of different particle populations to determine the ideal gain. As used herein, a "population", or "subpopulation" of analytes, such as cells or other particles, generally refers to a group of analytes that possess properties (for example, optical, impedance, or temporal properties) with respect to one or more measured fluorescent parameters such that measured parameter data form a cluster in the data space. Thus, populations are recognized as clusters in the data. Conversely, each data cluster generally is interpreted as corresponding to a population of a particular type of cell or analyte, although clusters that correspond to noise or background typically also are observed. A cluster may be defined in a subset of the dimensions, e.g., with respect to a subset of the measured fluorescent parameters (i.e., fluorochromes), which corresponds to populations that differ in only a subset of the measured parameters or features extracted from the measurements of the sample. In certain instances, the plurality of particle populations comprises a first particle population that is negative for a particular parameter and a second particle population that is positive for the same parameter. Particle populations may be described as being "positive" or "negative" with respect to a given property or parameter based on whether that property is observed.

In embodiments of the methods involving the assessment of flow cytometer data associated with a plurality of different particle populations to determine the ideal gain, methods may include acquiring a first and a second signal magnitude for each of the first and second particle populations, respectively, at each gain in the plurality of successively increasing gains. The first and second signal magnitudes may either be obtained from the sample by the detector, or surrogated using other values (e.g., baseline noise and/or gain, as appropriate). For example, versions of the method include estimating the first signal magnitude based on the baseline noise level obtained by the detector at each gain in the plurality of successively increasing gains. Similarly, methods may include estimating the second signal magnitude based on each gain in the plurality of successively increasing gains. In other cases, methods include acquiring the first and/or second signal magnitudes from the detector.

In some cases, methods include generating a linearity scale (sometimes referred to as a "linearity range") for evaluating how the difference between the second and first signal magnitudes increases with increasing detector gain. Detector linearity is discussed in, e.g., Bagwell et al. *Cytometry: The Journal of the International Society for Analytical Cytology*. 10:689-694 (1989); herein incorporated by reference in its entirety. Methods according to these embodiments include taking the difference of the first and second signal magnitudes acquired at each gain. In addition, versions of the method include identifying a point of non-linearity at which the difference between the second and first signal magnitudes does not increase linearly with increasing detector gain. For example, where $r_2$ is a second signal magnitude and $r_1$ is a first signal magnitude, the difference between the second and first signal magnitudes at a particular iteration within the successively increasing gains i is $(r_2-r_1)_i$. In this example, the difference between the second and first signal magnitudes calculated with respect to the first gain within the successively increasing gains is $(r_2-r_1)_1$, the difference between the second and first signal magnitudes calculated with respect to the second gain within the successively increasing gains is $(r_2-r_1)_2$, and so on. Where n is a particular value for i, if $(r_2-r_1)_n$ is off the linear scale (i.e., results in a difference that does not increase linearly with respect to the preceding iterations), $(r_2-r_1)_n$ may be considered a point of non-linearity. Where a point of non-linearity is identified, methods according to certain embodiments may include determining a gain that is lower than the gain associated with the point of non-linearity to be the ideal gain. In some instances, methods include determining that the gain associated with a difference between first and second signal magnitudes that is immediately lower than the gain associated with the point of non-linearity within the plurality of successively increasing gains is the ideal gain. In the example provided above, assuming that $(r_2-r_1)_n$, n is the point of non-linearity, the gain associated with $(r_2-r_1)_{n-1}$ may be determined to be the ideal gain. However, in alternative versions, other gains that are lower than the gain associated with the point of non-linearity may be determined to be the ideal gain, such as gains associated with $(r_2-r_1)_{n-2}$, $(r_2-r_1)_{n-3}$ etc.

Some embodiments of the method involve both determining an ideal gain by evaluating an LoD curve for the presence of an inflection point and assessing flow cytometer data associated with a plurality of different particle populations. Where methods include a combination of protocols for determining ideal gain, each protocol may be employed in any suitable order. In certain cases, methods include assessing flow cytometer data associated with a plurality of different particle populations first (i.e., for each iteration of the increasing gains). For example, if a certain gain results in a point of non-linearity, the previous gain that puts the brightest population within linear range may be selected as an ideal gain. If that same gain does not result in a point of non-linearity, the LoD curve may be analyzed for the presence of an inflection point. If an inflection point is detected, the gain may be determined to be the ideal gain. If not, the method may include increasing the gain, and repeating the above steps.

In certain cases, embodiments of the method include performing the method with respect to each detector in a light detection system. Light detection systems may include any convenient number of detectors or detectors arrays. For example, the number of detectors may range from 1 to 100, such as 1 to 50, such as 1 to 25, and including 2 to 10. Where the ideal gain is determined for a plurality of detectors, the ideal gains may be determined either simultaneously or at different times. In some cases, the ideal gains associated with a plurality of different detectors are determined simultaneously. In other cases, the ideal gains associated with a plurality of different detectors are determined at one or more different times (e.g., sequentially). In certain cases, methods of interest include terminating the incremental gain increase following the determination of the ideal gain. In other words, after an ideal gain has been determined for a given detector by any of the methods described above, sweeping the gains is no longer required and is terminated.

FIG. 1 presents a flowchart depicting the workflow for determining an ideal gain according to certain embodiments. In the embodiment of FIG. 1, the method begins in step 101 by loading a particulate sample for analysis in a flow cytometer. In step 102, an event rate is set by selecting the sensitivity with which a trigger sensor (e.g., in a forward scatter or light loss channel) observes the presence of a particle and produces a trigger signal (e.g., by setting a detection threshold and gain). In FIG. 1, the gain for each fluorescent light detector in the light detection system is determined simultaneously. As such, step 103 includes increasing the gain for all of the fluorescence channels. In step 104, an LoD is calculated with respect to the gain resulting from step 103. In step 105, signal collected with respect to particle populations at the gain resulting from step 103 is analyzed to determine whether the brightest population is out of linear range (i.e., is a point of non-linearity). If this is the case, the previous gain is determined to be the ideal gain in step 106. If this is not the case, the method proceeds to step 107 where it is determined if the LoD calculated in step 104 results in an inflection point. If an inflection point is present, the gain in step 103 is determined to be the ideal gain. If an inflection point is not present, the method returns to step 103 where the gain is increased once more.

As discussed above, the detector(s) that may employed in the subject methods include, inter alia, photomultiplier tubes (PMTs) and/or avalanche photodiodes (APDs). Where one or more detectors are PMTs, excess noise is gain-independent. As such, the noise increases with the gain at the same rate as the signal, resulting in a flat SNR once the gain-dependent noise becomes dominant. Consequently, there may exist a range of optimal gains for PMTs. In certain cases where PMTs are employed, a gain at the lower end of the range of optimal gains is selected as the ideal gain to maximize dynamic range. Where one or more detectors are APDs, the noise depends on gains according to a power-law relationship. Therefore, the noise grows with gain faster than signal. Therefore, the LoD curve (i.e., SNR curve) is convex for APDs and there exists an optimal gain at which the SNR is maximized. Consequently, in certain cases where APDs are employed, methods include determining that the gain at which SNR is maximized is the ideal gain.

Figure 2A:
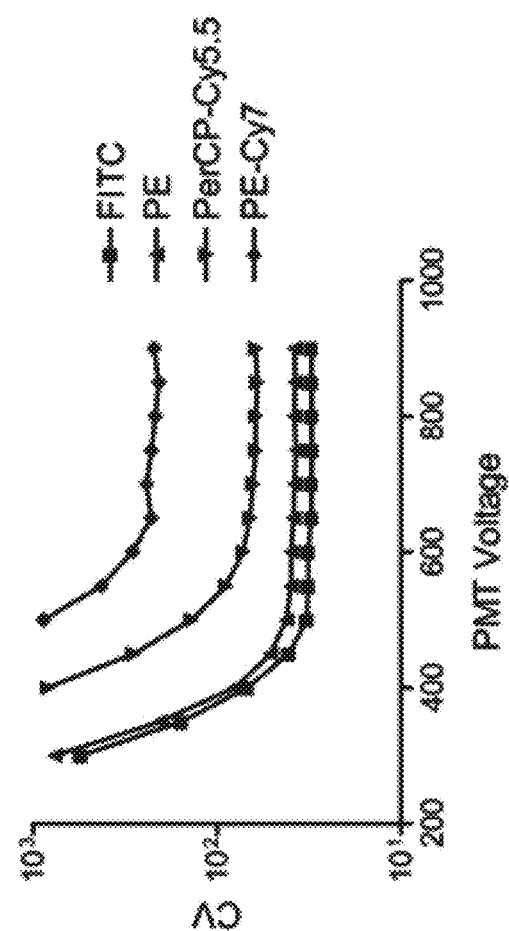
FIG. 2A-C depict the change of sensitivity metrics with detector gains or voltages for avalanche photodiodes (FIG. 2A), photomultiplier tubes (FIG. 2B), and avalanche photodiodes at different levels of optical background (FIG. 2C).
Figure 2B:
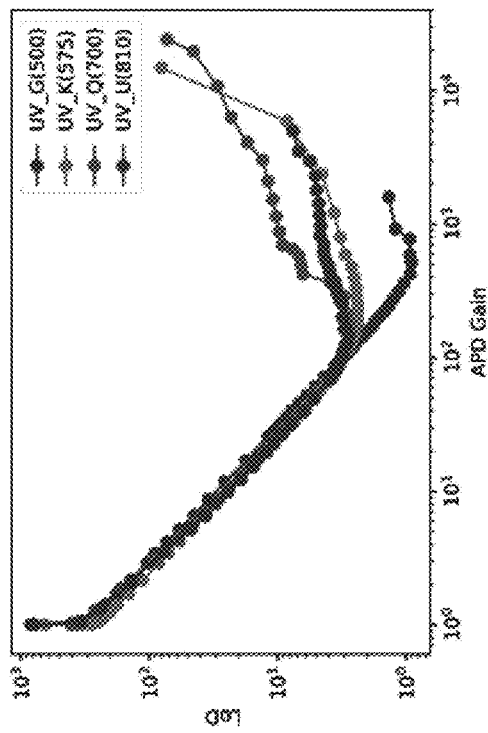
Figure 2C:
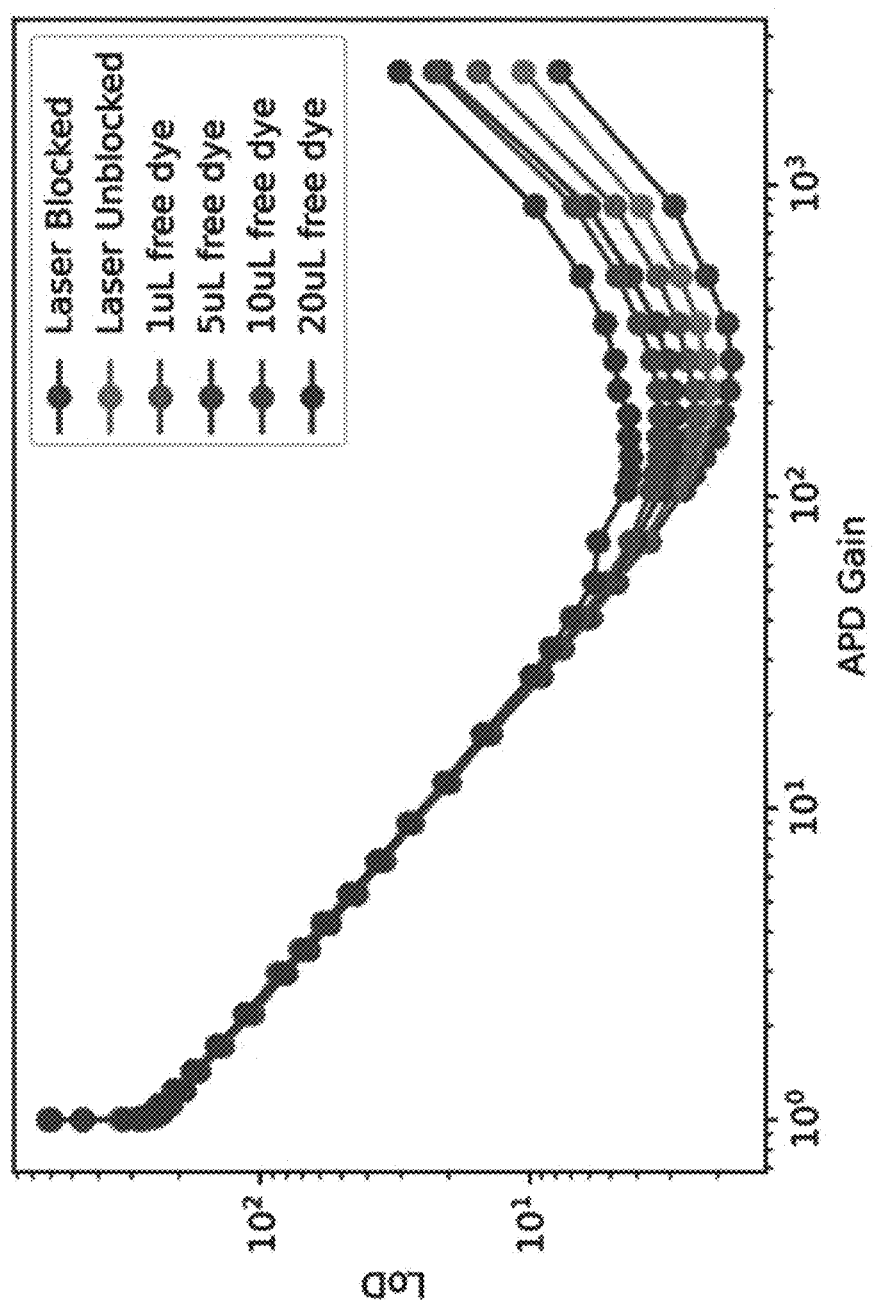

As discussed above, embodiments of the method include using baseline noise to surrogate the noise of the dimmest population. In some instances, this approximation will give rise to gains that are higher than true optimal gains. However, such an approximation will still yield optimal fluorophore spreads for PMT-based systems. In certain instances involving APD-based systems, fluorophore spreads may be degraded. However, in such instances, this degradation may result in an overestimation of the optimal gain which will have a smaller impact on LoD than underestimation. For example, FIG. 2A-B depicts the change of sensitivity metrics with detector gains or voltages for APDs (FIG. 2A) and PMTs (FIG. 2B). As shown in the LoD curves of FIG. 2A, the gain passing the minimal point will degrade the LoD. However, the optimum is shallow, and an overestimation of the optimal gain will have a smaller impact on the LoD than underestimation. As shown in FIG. 2B, a voltage higher than the inflection voltage will still give rise to the same CV. FIG. 2B is adapted from Maecker HT and Trotter J (2006) *Cytometry A* 69:1037-1042. FIG. 2C depicts multiple exemplary LoD curves showing the variation of LoD with gains for APDs at different levels of optical background. As shown in FIG. 2C, the optimal gains depend on the level of optical background present. In other words, a suitable gain depends in part on sample characteristics. The sample-specific method of the present invention permits the determination of an ideal gain suitable for the optical background associated with each sample.

In certain cases, the sample analyzed is a particulate sample. In other words, the sample includes a plurality of particles (e.g., cells, beads, polynucleotides, proteins, etc.). In some instances, the sample analyzed in the instant methods is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class Mammalia, including the orders carnivore (e.g., dogs and cats), Rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

Cells of interest may be targeted for characterized according to a variety of parameters, such as a phenotypic characteristic identified via the attachment of a particular fluorescent label to cells of interest. In some embodiments, the system is configured to deflect analyzed droplets that are determined to include a target cell. A variety of cells may be characterized using the subject methods. Target cells of interest include, but are not limited to, stem cells, T cells, dendritic cells, B Cells, granulocytes, leukemia cells, lymphoma cells, virus cells (e.g., HIV cells), NK cells, macrophages, monocytes, fibroblasts, epithelial cells, endothelial cells, and erythroid cells. Target cells of interest include cells that have a convenient cell surface marker or antigen that may be captured or labelled by a convenient affinity agent or conjugate thereof. For example, the target cell may include a cell surface antigen such as CD11b, CD123, CD14, CD15, CD16, CD19, CD193, CD2, CD25, CD27, CD3, CD335, CD36, CD4, CD43, CD45RO, CD56, CD61, CD7, CD8, CD34, CD1c, CD23, CD304, CD235a, T cell receptor alpha/beta, T cell receptor gamma/delta, CD253, CD95, CD20, CD105, CD117, CD120b, Notch4, Lgr5 (N-Terminal), SSEA-3, TRA-1-60 Antigen, Disialoganglioside GD2 and CD71. In some embodiments, the target cell is selected from HIV containing cell, a Treg cell, an antigen-specific T-cell populations, tumor cells or hematopoietic progenitor cells (CD34+) from whole blood, bone marrow or cord blood.

Methods of interest may further include employing particles in research, laboratory testing, or therapy. In some embodiments, the subject methods include obtaining individual cells prepared from a target fluidic or tissue biological sample. For example, the subject methods include obtaining cells from fluidic or tissue samples to be used as a research or diagnostic specimen for diseases such as cancer. Likewise, the subject methods include obtaining cells from fluidic or tissue samples to be used in therapy. A cell therapy protocol is a protocol in which viable cellular material including, e.g., cells and tissues, may be prepared and introduced into a subject as a therapeutic treatment. Conditions that may be treated by the administration of the flow cytometrically sorted sample include, but are not limited to, blood disorders, immune system disorders, organ damage, etc.

A typical cell therapy protocol may include the following steps: sample collection, cell isolation, genetic modification, culture, and expansion in vitro, cell harvesting, sample volume reduction and washing, bio-preservation, storage, and introduction of cells into a subject. The protocol may begin with the collection of viable cells and tissues from source tissues of a subject to produce a sample of cells and/or tissues. The sample may be collected via any suitable procedure that includes, e.g., administering a cell mobilizing agent to a subject, drawing blood from a subject, removing bone marrow from a subject, etc. After collecting the sample, cell enrichment may occur via several methods including, e.g., centrifugation based methods, filter based methods, elutriation, magnetic separation methods, fluorescence-activated cell sorting (FACS), and the like. In some cases, the enriched cells may be genetically modified by any convenient method, e.g., nuclease mediated gene editing. The genetically modified cells can be cultured, activated, and expanded in vitro. In some cases, the cells are preserved, e.g., cryopreserved, and stored for future use where the cells are thawed and then administered to a patient, e.g., the cells may be infused in the patient.

Systems For Classifying Flow Cytometer Data

Aspects of the invention also include systems. Systems of interest include a flow cell configured to transport a flow stream, a light source for irradiating the flow stream at an interrogation point, a detector configured to collect light from the flow stream, and a processor operably connected to the detector. Processors of interest are configured to incrementally increase the gain of the detector such that the detector collects light from the flow stream at each of a plurality of successively increasing gains, obtain a baseline noise level from the detector at each gain in the plurality of successively increasing gains, calculate a limit of detection (LoD) for each gain in the plurality of successively increasing gains, and assess the calculated LoDs to determine an ideal gain. The systems described herein may be any particle analyzer configured to analyze particles in a flow stream. In certain cases, the system includes a flow cytometer. In some such cases, the flow cytometer is a polychromatic flow cytometer. In other instances, the flow cytometer is a spectral flow cytometer.

In some cases, the subject processors are operated in conjunction with programmable logic that may be implemented in hardware, software, firmware, or any combination thereof in order to, e.g., determine an ideal gain. For example, where programmable logic is implemented in software, determining an ideal gain may be realized at least in part by a computer-readable data storage medium comprising program code including instructions that, when executed, is configured to incrementally increase the gain of the detector such that the detector collects light from the flow stream at each of a plurality of successively increasing gains, obtain a baseline noise level from the detector at each gain in the plurality of successively increasing gains, calculate an LoD for each gain in the plurality of successively increasing gains, and assess the calculated LoDs to determine an ideal gain. For example, the program code may include instructions for generating a ratio between the gain and the baseline noise level, taking the inverse of the ratio between the gain and the baseline noise level, producing an LoD curve comprising the LoDs calculated for each gain in the plurality of successively increasing gains, and evaluating the LoD curve for the presence of an inflection point. In embodiments, the processor is configured to identify a gain in the plurality of successively increasing gains associated with the LoD at the inflection point. In addition, the program code may include instruction for assessing flow cytometer data associated with a plurality of different particle populations to determine the ideal gain, e.g., a first particle population that is negative for a particular parameter and a second particle population that is positive for the same parameter. The processor may additionally be configured to acquire a first and a second signal magnitude for each of the first and second particle populations, respectively, at each gain in the plurality of successively increasing gains, calculate a difference between the second and first signal magnitudes acquired at each gain in the plurality of successively increasing gains, generate a linearity scale for evaluating how the difference between the second and first signal magnitudes increases with increasing detector gain, and identify a point of non-linearity at which the difference between the second and first signal magnitudes does not increase linearly with increasing detector gain. The processor may, in certain cases, determine a gain that is lower than the gain associated with the point of non-linearity to be the ideal gain.

The subject programmable logic may be implemented in any of a variety of devices such as specifically programmed event processing computers, wireless communication devices, integrated circuit devices, or the like. In some embodiments, the programmable logic may be executed by a specifically programmed processor, which may include one or more processors, such as one or more digital signal processors (DSPs), configurable microprocessors, application specific integrated circuits (ASICs), field programmable gate arrays (FPGAs), or other equivalent integrated or discrete logic circuitry. A combination of computing devices, e.g., a combination of a DSP and a microprocessor, a plurality of microprocessors, one or more microprocessors in conjunction with a DSP core, or any other such configuration in at least partial data connectivity may implement one or more of the features described herein.

In certain cases, systems further include a display configured to output the flow ideal gains determined by the processor. In certain cases, the display outputs in the ideal gains in the form of TTVs. A user may subsequently view the flow cytometer data evaluated by the processor. The subject display may include, but is not limited to, a monitor, a tablet computer, a smartphone, or other electronic device configured to present graphical interfaces.

As discussed above, systems of interest include a flow cell. The term "flow cell" is described in its conventional sense to refer to a component, such as a cuvette, containing a flow channel having a liquid flow stream for transporting particles in a sheath fluid. Cuvettes of interest include containers having a passage running therethrough. The flow stream may include a liquid sample injected from a sample tube. Flow cells of interest include a light-accessible flow channel. In some instances, the flow cell includes transparent material (e.g., quartz) that permits the passage of light therethrough. In some embodiments, the flow cell is a stream-in-air flow cell in which light interrogation of the particles occurs in free space. In some cases, the flow stream is configured for irradiation with light from one or more light sources at interrogation points. As discussed herein, an "interrogation point" refers to a region within the flow stream in which a particle is irradiated by light from a light source, e.g., for analysis. The size of the interrogation point may vary as desired. For example, where 0 μm represents the axis of light emitted by the light relevant light source, the interrogation zone may range from −100 μm to 100 μm, such as −50 μm to 50 μm, such as −25 μm to 40 μm, and including −15 μm to 30 μm. The flow stream for which the flow channel is configured may include a liquid sample injected from a sample tube. In certain embodiments, the flow stream may include a narrow, rapidly flowing stream of liquid that is arranged such that linearly segregated particles transported therein are separated from each other in a single-file manner. After particles are irradiated in the flow cell, particle-modulated light may be observed.

Any convenient flow cell which propagates a fluidic sample to a sample interrogation region may be employed, where in some embodiments, the flow cell includes is a cylindrical flow cell, a frustoconical flow cell or a flow cell that includes a proximal cylindrical portion defining a longitudinal axis and a distal frustoconical portion which terminates in a flat surface having the orifice that is transverse to the longitudinal axis.

In some embodiments, the sample flow stream emanates from an orifice at the distal end of the flow cell. Depending on the desired characteristics of the flow stream, the flow cell orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell of interest has a circular orifice. The size of the nozzle orifice may vary, in some embodiments ranging from 1 μm to 10000 μm, such as from 25 μm to 7500 μm, such as from 50 μm to 5000 μm, such as from 75 μm to 1000 μm, such as from 100 μm to 750 μm and including from 150 μm to 500 μm. In certain embodiments, the nozzle orifice is 100 μm.

In some embodiments, the flow cell includes a sample injection port configured to provide a sample to the flow cell. The sample injection port may be an orifice positioned in a wall of the inner chamber or may be a conduit positioned at the proximal end of the inner chamber. Where the sample injection port is an orifice positioned in a wall of the inner chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, such as 0.2 to 3.0 mm, such as 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell inner chamber. For example, the sample injection port may be a conduit positioned to have the orifice of the sample injection port in line with the flow cell orifice. Where the sample injection port is a conduit positioned in line with the flow cell orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-sectional shape of the sample injection tube. For example, the orifice of the sample injection port may include a beveled tip having a bevel angle ranging from 1 degree to 10 degrees, such as from 2 degrees to 9 degrees, such as from 3 degrees to 8 degrees, such as from 4 degrees to 7 degrees and including a bevel angle of 5 degrees.

In some embodiments, the flow cell also includes a sheath fluid injection port configured to provide a sheath fluid to the flow cell. In embodiments, the sheath fluid injection system is configured to provide a flow of sheath fluid to the flow cell inner chamber, for example in conjunction with the sample to produce a laminated flow stream of sheath fluid surrounding the sample flow stream. Depending on the desired characteristics of the flow stream, the rate of sheath fluid conveyed to the flow cell chamber may be 25 μL/sec to 2500 μL/sec, such as 50 μL/sec to 1000 μL/sec, and including 75 μL/sec or more to 750 μL/sec.

In some embodiments, the sheath fluid injection port is an orifice positioned in a wall of the inner chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In some embodiments, systems further include a pump in fluid communication with the flow cell to propagate the flow stream through the flow cell. Any convenient fluid pump protocol may be employed to control the flow of the flow stream through the flow cell. In certain instances, systems include a peristaltic pump, such as a peristaltic pump having a pulse damper. The pump in the subject systems is configured to convey fluid through the flow cell at a rate suitable for multi-photon counting of light from the sample in the flow stream. For example, the system may include a pump that is configured to flow sample through the flow cell at a rate that ranges from 1 nL/min to 500 nL/min, such as from 1 nL/min to 250 nL/min, such as from 1 nL/min to 100 nL/min, such as from 2 nL/min to 90 nL/min, such as from 3 nL/min to 80 nL/min, such as from 4 nL/min to 70 nL/min, such as from 5 nL/min to 60 nL/min and including from 10 nL/min to 50 nL/min. In certain embodiments, the flow rate of the flow stream is from 5 nL/min to 6 nL/min.

Aspects of the subject systems also includes a light source for irradiating the flow stream at an interrogation point. Any convenient light source may be employed, such as a laser. In embodiments, the laser may be any convenient laser, such as a continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject flow cytometers include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject flow cytometers include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

Laser light sources according to certain embodiments may also include one or more optical adjustment components. In certain embodiments, the optical adjustment component is located between the light source and the flow cell, and may include any device that is capable of changing the spatial width of irradiation or some other characteristic of irradiation from the light source, such as for example, irradiation direction, wavelength, beam width, beam intensity and focal spot. Optical adjustment protocols may include any convenient device which adjusts one or more characteristics of the light source, including but not limited to lenses, mirrors, filters, fiber optics, wavelength separators, pinholes, slits, collimating protocols and combinations thereof. In certain embodiments, flow cytometers of interest include one or more focusing lenses. The focusing lens, in one example, may be a de-magnifying lens. In still other embodiments, flow cytometers of interest include fiber optics.

Where the optical adjustment component is configured to move, the optical adjustment component may be configured to be moved continuously or in discrete intervals, such as for example in 0.01 µm or greater increments, such as 0.05 µm or greater, such as 0.1 µm or greater, such as 0.5 µm or greater such as 1 µm or greater, such as 10 µm or greater, such as 100 µm or greater, such as 500 µm or greater, such as 1 mm or greater, such as 5 mm or greater, such as 10 mm or greater and including 25 mm or greater increments.

Any displacement protocol may be employed to move the optical adjustment component structures, such as coupled to a moveable support stage or directly with a motor actuated translation stage, leadscrew translation assembly, geared translation device, such as those employing a stepper motor, servo motor, brushless electric motor, brushed DC motor, micro-step drive motor, high resolution stepper motor, among other types of motors.

The light source may be positioned any suitable distance from the flow cell, such as where the light source and the flow cell are separated by 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the light source may be positioned at any suitable angle relative to the flow cell, such as at an angle ranging from 10 degrees to 90 degrees, such as from 15 degrees to 85 degrees, such as from 20 degrees to 80 degrees, such as from 25 degrees to 75 degrees and including from 30 degrees to 60 degrees, for example at a 90 degree angle.

Systems according to certain embodiments include a plurality of light sources. In some cases, the plurality of light sources includes a plurality of lasers. such as 2 lasers or more, such as 3 lasers or more, such as 4 lasers or more, such as 5 lasers or more, such as 10 lasers or more, and including 15 lasers or more configured to provide laser light for discrete irradiation of the flow stream. Depending on the desired wavelengths of light for irradiating the flow stream, each laser may have a specific wavelength that varies from 200 nm to 1500 nm, such as from 250 nm to 1250 nm, such as from 300 nm to 1000 nm, such as from 350 nm to 900 nm and including from 400 nm to 800 nm. In certain embodiments, lasers of interest may include one or more of a 405 nm laser, a 488 nm laser, a 561 nm laser and a 635 nm laser.

Systems of interest may include one or more detectors for detecting particle-modulated light intensity data. In some embodiments, the particle-modulated light detector(s) include one or more forward-scattered light detectors configured to detect forward-scattered light. For example, the subject particle analyzers may include 1 forward-scattered light detector or multiple forward-scattered light detectors, such as 2 or more, such as 3 or more, such as 4 or more, and including 5 or more. In certain embodiments, particle analyzers include 1 forward-scattered light detector. In other embodiments, particle analyzers include 2 forward-scattered light detectors. Any convenient detector for detecting collected light may be used in the forward-scattered light detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 cm$^2$ to 10 cm$^2$, such as from 0.05 cm$^2$ to 9 cm$^2$, such as from 0.1 cm$^2$ to 8 cm$^2$, such as from 0.5 cm$^2$ to 7 cm$^2$ and including from 1 cm$^2$ to 5 cm$^2$.

In embodiments, the forward-scattered light detector is configured to measure light continuously or in discrete intervals. In some instances, detectors of interest are configured to take measurements of the collected light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In some instances, systems include one or more side-scattered light detectors for detecting side-scatter wavelengths of light (i.e., light refracted and reflected from the surfaces and internal structures of the particle). In some embodiments, particle analyzers include a single side-scattered light detector. In other embodiments, particle analyzers include multiple side-scattered light detectors, such as 2 or more, such as 3 or more, such as 4 or more, and including 5 or more.

Any convenient detector for detecting collected light may be used in the side-scattered light detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from 0.1 $cm^2$ to 8 $cm^2$, such as from 0.5 $cm^2$ to 7 $cm^2$ and including from 1 $cm^2$ to 5 $cm^2$.

In embodiments, the subject systems also include a fluorescent light detector configured to detect one or more fluorescent wavelengths of light. In other embodiments, particle analyzers include multiple fluorescent light detectors such as 2 or more, such as 3 or more, such as 4 or more, 5 or more, 10 or more, 15 or more, and including 20 or more.

Any convenient detector for detecting collected light may be used in the fluorescent light detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

Where the subject particle analyzers include multiple fluorescent light detectors, each fluorescent light detector may be the same, or the collection of fluorescent light detectors may be a combination of different types of detectors. For example, where the subject particle analyzers include two fluorescent light detectors, in some embodiments the first fluorescent light detector is a CCD-type device and the second fluorescent light detector (or imaging sensor) is a CMOS-type device. In other embodiments, both the first and second fluorescent light detectors are CCD-type devices. In yet other embodiments, both the first and second fluorescent light detectors are CMOS-type devices. In still other embodiments, the first fluorescent light detector is a CCD-type device and the second fluorescent light detector is a photomultiplier tube (PMT). In still other embodiments, the first fluorescent light detector is a CMOS-type device and the second fluorescent light detector is a photomultiplier tube. In yet other embodiments, both the first and second fluorescent light detectors are photomultiplier tubes.

In embodiments of the present disclosure, fluorescent light detectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths. In some embodiments, 2 or more detectors in the particle analyzers as described herein are configured to measure the same or overlapping wavelengths of collected light.

In some embodiments, fluorescent light detectors of interest are configured to measure collected light over a range of wavelengths (e.g., 200 nm-1000 nm). In certain embodiments, detectors of interest are configured to collect spectra of light over a range of wavelengths. For example, particle analyzers may include one or more detectors configured to collect spectra of light over one or more of the wavelength ranges of 200 nm-1000 nm. In yet other embodiments, detectors of interest are configured to measure light emitted by a sample in the flow stream at one or more specific wavelengths. For example, particle analyzers may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, one or more detectors may be configured to be paired with specific fluorophores, such as those used with the sample in a fluorescence assay.

In some embodiments, one or more of the particle-modulated light detectors includes one or more detector arrays, such as an array of photodiodes. In these embodiments, each detector array may include 4 or more detectors, such as 10 or more detectors, such as 25 or more detectors, such as 50 or more detectors, such as 100 or more detectors, such as 250 or more detectors, such as 500 or more detectors, such as 750 or more detectors and including 1000 or more detectors. For example, the detector may be a photodiode array having 4 or more photodiodes, such as 10 or more photodiodes, such as 25 or more photodiodes, such as 50 or more photodiodes, such as 100 or more photodiodes, such as 250 or more photodiodes, such as 500 or more photodiodes, such as 750 or more photodiodes and including 1000 or more photodiodes.

The detectors may be arranged in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular patterned configurations. The detectors in the detector array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°. The detector array may be any suitable shape and may be a rectilinear shape, e.g., squares, rectangles, trapezoids, triangles, hexagons, etc., curvilinear shapes, e.g., circles, ovals, as well as irregular shapes, e.g., a parabolic bottom portion coupled to a planar top portion. In certain embodiments, the detector array has a rectangular-shaped active surface.

In some embodiments, particle analyzers include one or more wavelength separators positioned between the flow cell and the particle-modulated light detector(s). The term "wavelength separator" is used herein in its conventional sense to refer to an optical component that is configured to separate light collected from the sample into predetermined spectral ranges. In some embodiments, particle analyzers include a single wavelength separator. In other embodiments, particle analyzers include a plurality of wavelength separators, such as 2 or more wavelength separators, such as 3 or more, such as 4 or more, such as 5 or more, such as 6 or more, such as 7 or more, such as 8 or more, such as 9 or more, such as 10 or more, such as 15 or more, such as 25 or more, such as 50 or more, such as 75 or more and including 100 or more wavelength separators. In some embodiments, the wavelength separator is configured to separate light collected from the sample into predetermined spectral ranges by passing light having a predetermined spectral range and reflecting one or more remaining spectral ranges of light. In other embodiments, the wavelength separator is configured to separate light collected from the sample into predetermined spectral ranges by passing light having a predetermined spectral range and absorbing one or more remaining spectral ranges of light. In yet other embodiments, the wavelength separator is configured to spatially diffract light collected from the sample into predetermined spectral ranges. Each wavelength separator may be any convenient light separation protocol, such as one or more dichroic mirrors, bandpass filters, diffraction gratings, beam splitters or prisms. In some embodiments, the wavelength separator is a prism. In other embodiments, the wavelength separator is a diffraction grating. In certain embodiments, wavelength separators in the subject light detection systems are dichroic mirrors.

In certain cases, one or more detectors in the system may be considered a trigger sensor (i.e., a sensor that observes the presence of the particle and produces a trigger signal). In some embodiments, the trigger sensor is a forward-scattered light detector (e.g., such as those described above). In other cases, the trigger sensor is an axial light loss (ALL) channel sensor. In such cases, the processor may be configured to calculate a trigger window based on the trigger signal, wherein the trigger window provides a time period during which the particle is expected to pass through a detection zone of the detector, and obtain the baseline noise level at time periods that are outside of the trigger window.

Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem.* Jan; 49(pt 1):17-28; Linden, et. al., *Semin Throm Hemost.* 2004 October; 30(5):502-11; Alison, et al. *J Pathol,* 2010 Dec; 222(4): 335-344; and Herbig, et al. (2007) *Crit Rev Ther Drug Carrier Syst.* 24(3):203-255; the disclosures of which are incorporated herein by reference. In certain instances, flow cytometry systems of interest include BD Biosciences FACSCanto™ flow cytometer, BD Biosciences FACSCanto™ II flow cytometer, BD Accuri™ flow cytometer, BD Accuri™ C6 Plus flow cytometer, BD Biosciences FACSCelestav flow cytometer, BD Biosciences FACSLyric™ flow cytometer, BD Biosciences FACSVerse™ flow cytometer, BD Biosciences FACSymphony™ flow cytometer, BD Biosciences LSRFortessa™ flow cytometer, BD Biosciences LSR-Fortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter, BD Biosciences Via™ cell sorter, BD Biosciences Influx™ cell sorter, BD Biosciences Jazz™ cell sorter, BD Biosciences Aria™ cell sorter, BD Biosciences FACSAria™ II cell sorter, BD Biosciences FACSAria™ III cell sorter, BD Biosciences FACSAria™ Fusion cell sorter and BD Biosciences FACSMelody™ cell sorter, BD Biosciences FACSymphony™ S6 cell sorter or the like.

In some embodiments, the subject systems are flow cytometric systems, such those described in U.S. Pat. Nos. 10,663,476; 10,620,111; 10,613,017; 10,605,713; 10,585,031; 10,578,542; 10,578,469; 10,481,074; 10,302,545; 10,145,793; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; 4,987,086; 4,498,766; the disclosures of which are herein incorporated by reference in their entirety. In some cases, flow cytometry systems of the invention are clustered wavelength division (CWD) systems. CWD systems are described in, for example, U.S. Patent Application Publication No. 2021/0247293; the disclosure of which is herein incorporated by reference in its entirety.

In certain instances, flow cytometry systems of the invention are configured for imaging particles in a flow stream by fluorescence imaging using radiofrequency tagged emission (FIRE), such as those described in Diebold, et al. Nature Photonics Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

Figure 3:
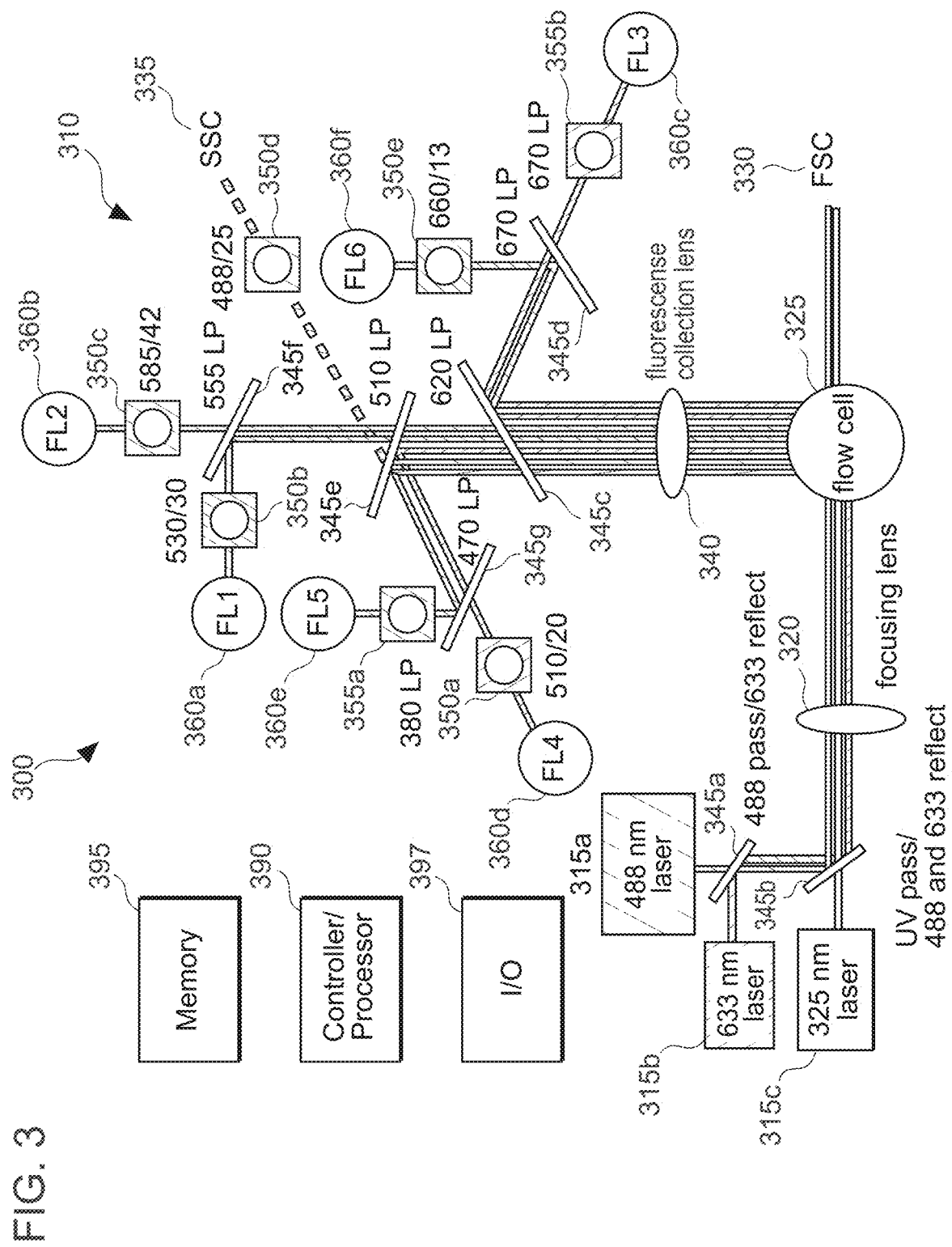
FIG. 3 depicts a functional block diagram of a flow cytometric system according to certain embodiments.

FIG. 3 shows a system 300 for flow cytometry in accordance with an illustrative embodiment of the present invention. The system 300 includes a flow cytometer 310, a controller/processor 390 and a memory 395. The flow cytometer 310 includes one or more excitation lasers 315*a*-315*c*, a focusing lens 320, a flow chamber 325, a forward-scatter detector 330, a side-scatter detector 335, a fluorescence collection lens 340, one or more beam splitters 345*a*-345*g*, one or more bandpass filters 350*a*-350*e*, one or more longpass ("LP") filters 355*a*-355*b*, and one or more fluorescent detectors 360*a*-360*f*.

The excitation lasers 315*a-c* emit light in the form of a laser beam. The wavelengths of the laser beams emitted from excitation lasers 315*a*-315*c* are 488 nm, 633 nm, and 325 nm, respectively, in the example system of FIG. 3. The laser beams are first directed through one or more of beam splitters 345*a* and 345*b*. Beam splitter 345*a* transmits light at 488 nm and reflects light at 633 nm. Beam splitter 345*b* transmits UV light (light with a wavelength in the range of 10 to 400 nm) and reflects light at 488 nm and 633 nm.

The laser beams are then directed to a focusing lens 320, which focuses the beams onto the portion of a fluid stream where particles of a sample are located, within the flow chamber 325. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward-scatter detector 330, the side-scatter detector 335, and the one or more fluorescent detectors 360a-360f through one or more of the beam splitters 345c-345g, the bandpass filters 350a-350e, the longpass filters 355a-355b, and the fluorescence collection lens 340.

The fluorescence collection lens 340 collects light emitted from the particle-laser beam interaction and routes that light towards one or more beam splitters and filters. Bandpass filters, such as bandpass filters 350a-350e, allow a narrow range of wavelengths to pass through the filter. For example, bandpass filter 350a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 355a-355b, transmit wavelengths of light equal to or longer than a specified wavelength of light. For example, longpass filter 355b, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

The forward-scatter detector 330 is positioned slightly off axis from the direct beam through the flow cell and is configured to detect diffracted light, the excitation light that travels through or around the particle in mostly a forward direction. The intensity of the light detected by the forward-scatter detector is dependent on the overall size of the particle. The forward-scatter detector can include a photodiode. The side-scatter detector 335 is configured to detect refracted and reflected light from the surfaces and internal structures of the particle that tends to increase with increasing particle complexity of structure. The fluorescence emissions from fluorescent molecules associated with the particle can be detected by the one or more fluorescent detectors 360a-360f. The side-scatter detector 335 and fluorescent detectors can include photomultiplier tubes. The signals detected at the forward-scatter detector 330, the side-scatter detector 335 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 3, but can include any flow cytometer known in the art. For example, a flow cytometer may have any number of lasers, beam splitters, filters, and detectors at various wavelengths and in various different configurations.

In operation, cytometer operation is controlled by a controller/processor 390, and the measurement data from the detectors can be stored in the memory 395 and processed by the controller/processor 390. Although not shown explicitly, the controller/processor 390 is coupled to the detectors to receive the output signals therefrom, and may also be coupled to electrical and electromechanical components of the flow cytometer 310 to control the lasers, fluid flow parameters, and the like. Input/output (I/O) capabilities 397 may be provided also in the system. The memory 395, controller/processor 390, and I/O 397 may be entirely provided as an integral part of the flow cytometer 310. In such an embodiment, a display may also form part of the I/O capabilities 397 for presenting experimental data to users of the cytometer 310. Alternatively, some or all of the memory 395 and controller/processor 390 and I/O capabilities may be part of one or more external devices such as a general purpose computer. In some embodiments, some or all of the memory 395 and controller/processor 390 can be in wireless or wired communication with the cytometer 310. The controller/processor 390 in conjunction with the memory 395 and the I/O 397 can be configured to perform various functions related to the preparation and analysis of a flow cytometer experiment.

The system illustrated in FIG. 3 includes six different detectors that detect fluorescent light in six different wavelength bands (which may be referred to herein as a "filter window" for a given detector) as defined by the configuration of filters and/or splitters in the beam path from the flow cell 325 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. The I/O 397 can be configured to receive data regarding a flow cytometer experiment having a panel of fluorescent labels and a plurality of cell populations having a plurality of markers, each cell population having a subset of the plurality of markers. The I/O 397 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 395. The controller/processor 390 can be configured to evaluate one or more assignments of labels to markers.

In some embodiments, the subject systems are particle sorting systems that are configured to sort particles with an enclosed particle sorting module, such as those described in U.S. Patent Publication No. 2017/0299493, filed on Mar. 28, 2017, the disclosure of which is incorporated herein by reference. In certain embodiments, particles (e.g., cells) of the sample are sorted using a sort decision module having a plurality of sort decision units, such as those described in U.S. Patent Publication No. 2020/0256781, filed on Dec. 23, 2019, the disclosure of which is incorporated herein by reference. In some embodiments, systems for sorting components of a sample include a particle sorting module having deflection plates, such as described in U.S. Patent Publication No. 2017/0299493, filed on Mar. 28, 2017, the disclosure of which is incorporated herein by reference.

Figure 4:
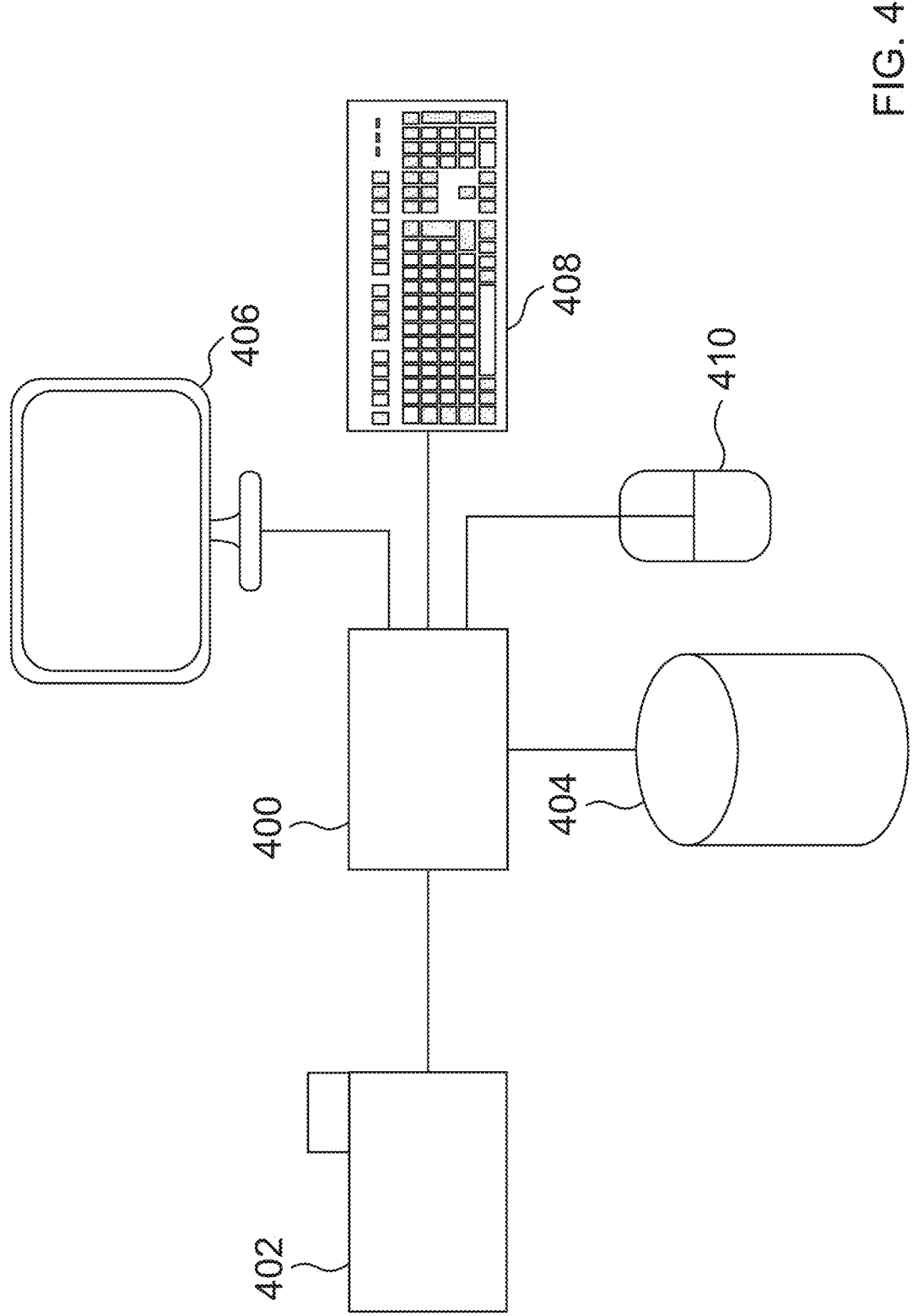
FIG. 4 depicts a control system according to certain embodiments.

FIG. 4 shows a functional block diagram for one example of a system, having a processor 400, for analyzing and displaying biological events. A processor 400 can be configured to implement a variety of processes for controlling graphic display of biological events.

A flow cytometer or sorting system 402 can be configured to acquire biological event data. For example, a flow cytometer can generate flow cytometric event data (e.g., particle-modulated light data). The flow cytometer 402 can be configured to provide biological event data to the processor 400. A data communication channel can be included between the flow cytometer 402 and the processor 400. The biological event data can be provided to the processor 400 via the data communication channel.

The processor 400 can be configured to receive biological event data from the flow cytometer 402. The biological event data received from the flow cytometer 402 can include flow cytometric event data. The processor 400 is configured to evaluate the data received from the flow cytometer 402, e.g., as discussed above. Processor 400 may be configured to perform the subject methods and incrementally increase the gain of a detector (or plurality of detectors) such that the detector collects light from the flow stream at each of a plurality of successively increasing gains, obtain a baseline noise level from the detector at each gain in the plurality of successively increasing gains, calculate an LoD for each gain in the plurality of successively increasing gains, and assess the calculated LoDs to determine an ideal gain The processor 400 can be configured to provide a graphical display including a biological event data to a display device 406. For example, processor 400 may provide the ideal gains calculated for each of the detectors (e.g., fluorescent light detectors 360a-e) in the system to the graphical display device 406. These ideal gains may be outputted in the form of, e.g., tube target values (TTVs). The processor 400 can be further configured to render a region of interest as a gate around a population of biological event data shown by the display device 406, overlaid upon the first plot, for example. In some embodiments, the gate can be a logical combination of one or more graphical regions of interest drawn upon a single parameter histogram or bivariate plot. In some embodiments, the display can be used to display particle parameters or saturated detector data.

The processor 400 can be further configured to display the biological event data on the display device 406 within the gate differently from other events in the biological event data outside of the gate. For example, the processor 400 can be configured to render the color of biological event data contained within the gate to be distinct from the color of biological event data outside of the gate. The display device 406 can be implemented as a monitor, a tablet computer, a smartphone, or other electronic device configured to present graphical interfaces.

The processor 400 can be configured to receive a gate selection signal identifying the gate from a first input device. For example, the first input device can be implemented as a mouse 410. The mouse 410 can initiate a gate selection signal to the processor 400 identifying the gate to be displayed on or manipulated via the display device 406 (e.g., by clicking on or in the desired gate when the cursor is positioned there). In some implementations, the first device can be implemented as the keyboard 408 or other means for providing an input signal to the processor 400 such as a touchscreen, a stylus, an optical detector, or a voice recognition system. Some input devices can include multiple inputting functions. In such implementations, the inputting functions can each be considered an input device. For example, as shown in FIG. 4, the mouse 410 can include a right mouse button and a left mouse button, each of which can generate a triggering event.

The triggering event can cause the processor 400 to alter the manner in which the data is displayed, which portions of the data is actually displayed on the display device 406, and/or provide input to further processing such as selection of a population of interest for particle sorting.

In some embodiments, the processor 400 can be configured to detect when gate selection is initiated by the mouse 410. The processor 400 can be further configured to automatically modify plot visualization to facilitate the gating process. The modification can be based on the specific distribution of biological event data received by the processor 400. In some embodiments, the processor 400 expands the first gate such that a second gate is generated (e.g., as discussed above).

The processor 400 can be connected to a storage device 404. The storage device 404 can be configured to receive and store biological event data from the processor 400. The storage device 404 can also be configured to receive and store flow cytometric event data from the processor 400. The storage device 404 can be further configured to allow retrieval of biological event data, such as flow cytometric event data, by the processor 400.

The display device 406 can be configured to receive display data from the processor 400. The display data can comprise plots of biological event data and gates outlining sections of the plots. The display device 406 can be further configured to alter the information presented according to input received from the processor 400 in conjunction with input from the flow cytometer 402, the storage device 404, the keyboard 408, and/or the mouse 410.

In some implementations the processor 400 can generate a user interface to receive example events for sorting. For example, the user interface can include a mechanism for receiving example events or example images. The example events or images or an example gate can be provided prior to collection of event data for a sample or based on an initial set of events for a portion of the sample.

Figure 5A:
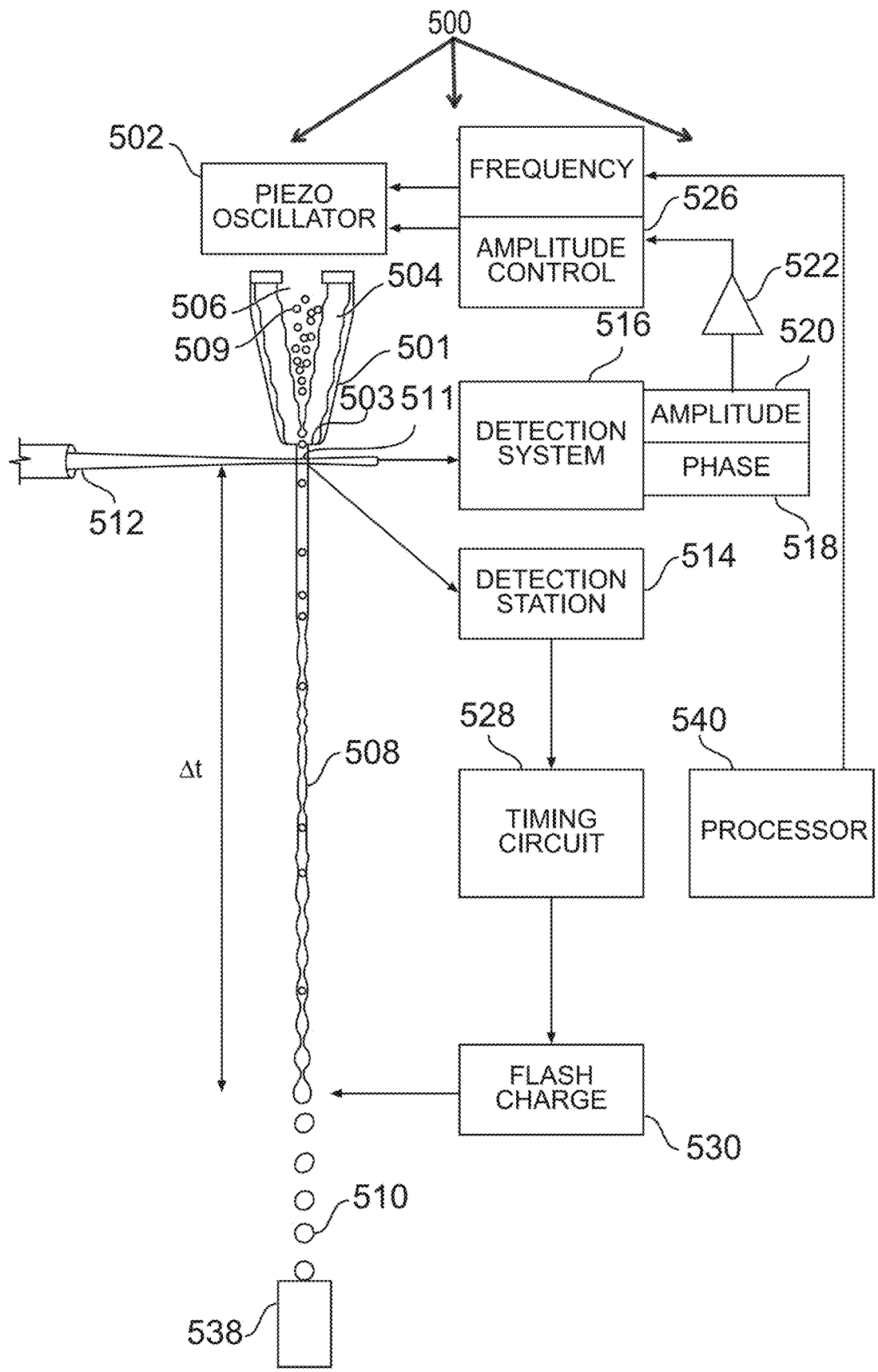
FIG. 5A-B depict a schematic drawing of a particle sorter system according to certain embodiments.

FIG. 5A is a schematic drawing of a particle sorter system 500 (e.g., the flow cytometer 402) in accordance with one embodiment presented herein. In some embodiments, the particle sorter system 500 is a cell sorter system. As shown in FIG. 5A, a drop formation transducer 502 (e.g., piezo-oscillator) is coupled to a fluid conduit 501, which can be coupled to, can include, or can be, a nozzle 503. Within the fluid conduit 501, sheath fluid 504 hydrodynamically focuses a sample fluid 506 comprising particles 509 into a moving fluid column 508 (e.g., a stream). Within the moving fluid column 508, particles 509 (e.g., cells) are lined up in single file to cross a monitored area 511 (e.g., where laser-stream intersect), irradiated by an irradiation source 512 (e.g., a laser). Vibration of the drop formation transducer 502 causes moving fluid column 508 to break into a plurality of drops 510, some of which contain particles 509.

In operation, a detection station 514 (e.g., an event detector) identifies when a particle of interest (or cell of interest) crosses the monitored area 511. Detection station 514 feeds into a timing circuit 528, which in turn feeds into a flash charge circuit 530. At a drop break off point, informed by a timed drop delay (Δt), a flash charge can be applied to the moving fluid column 508 such that a drop of interest carries a charge. The drop of interest can include one or more particles or cells to be sorted. The charged drop can then be sorted by activating deflection plates (not shown) to deflect the drop into a vessel such as a collection tube or a multi-well or microwell sample plate where a well or microwell can be associated with drops of particular interest. As shown in FIG. 5A, the drops can be collected in a drain receptacle 538.

A detection system 516 (e.g., a drop boundary detector) serves to automatically determine the phase of a drop drive signal when a particle of interest passes the monitored area 511. An exemplary drop boundary detector is described in U.S. Pat. No. 7,679,039, which is incorporated herein by reference in its entirety. The detection system 516 allows the instrument to accurately calculate the place of each detected particle in a drop. The detection system 516 can feed into an amplitude signal 520 and/or phase 518 signal, which in turn feeds (via amplifier 522) into an amplitude control circuit 526 and/or frequency control circuit 524. The amplitude control circuit 526 and/or frequency control circuit 524, in turn, controls the drop formation transducer 502. The amplitude control circuit 526 and/or frequency control circuit 524 can be included in a control system.

In some implementations, sort electronics (e.g., the detection system 516, the detection station 514 and a processor 540) can be coupled with a memory configured to store the detected events and a sort decision based thereon. The sort decision can be included in the event data for a particle. In some implementations, the detection system 516 and the detection station 514 can be implemented as a single detection unit or communicatively coupled such that an event measurement can be collected by one of the detection system 516 or the detection station 514 and provided to the non-collecting element.

Figure 5B:
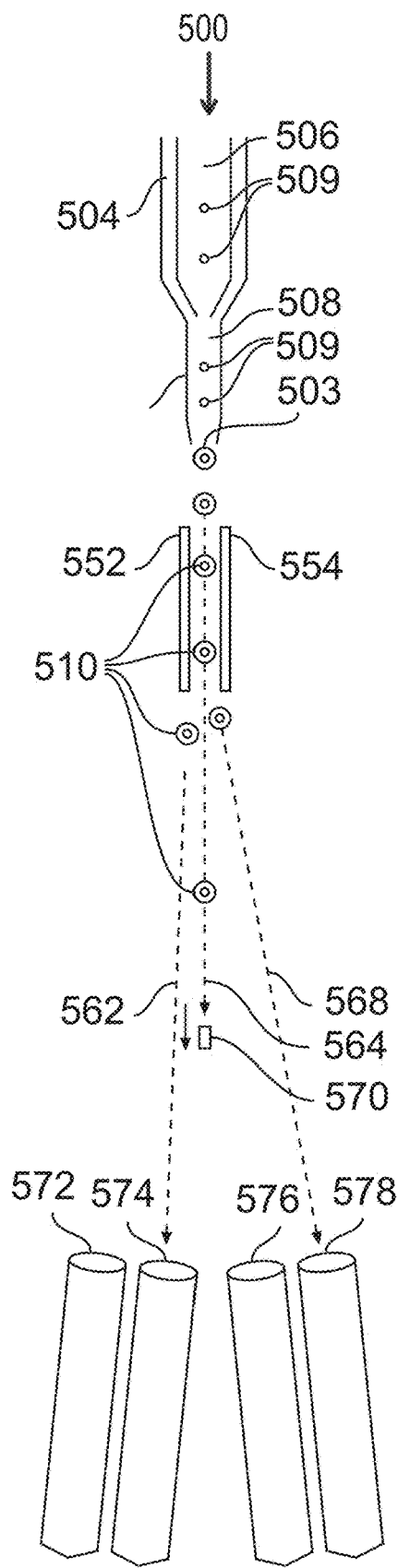

FIG. 5B is a schematic drawing of a particle sorter system, in accordance with one embodiment presented herein. The particle sorter system 500 shown in FIG. 5B, includes deflection plates 552 and 554. A charge can be applied via a stream-charging wire in a barb. This creates a stream of droplets 510 containing particles 509 for analysis. The particles can be illuminated with one or more light sources (e.g., lasers) to generate light scatter and fluorescence information. The information for a particle is analyzed such as by sorting electronics or other detection system (not shown in FIG. 5B). The deflection plates 552 and 554 can be independently controlled to attract or repel the charged droplet to guide the droplet toward a destination collection vessel (e.g., one of 572, 574, 576, or 578). As shown in FIG. 5B, the deflection plates 552 and 554 can be controlled to direct a particle along a first path 562 toward the vessel 574 or along a second path 568 toward the vessel 578. If the particle is not of interest (e.g., does not exhibit scatter or illumination information within a specified sort range), deflection plates may allow the particle to continue along a flow path 564. Such uncharged droplets may pass into a waste receptacle such as via aspirator 570.

The sorting electronics can be included to initiate collection of measurements, receive fluorescence signals for particles, and determine how to adjust the deflection plates to cause sorting of the particles. Example implementations of the embodiment shown in FIG. 5B include the BD FACSAria™ line of flow cytometers commercially provided by Becton, Dickinson and Company (Franklin Lakes, NJ).

Computer-Readable Storage Media

Aspects of the present disclosure further include non-transitory computer readable storage mediums having instructions for practicing the subject methods. Computer readable storage mediums may be employed on one or more computers for complete automation or partial automation of a system for practicing methods described herein. In certain embodiments, instructions in accordance with the method described herein can be coded onto a computer-readable medium in the form of "programming", where the term "computer readable medium" as used herein refers to any non-transitory storage medium that participates in providing instructions and data to a computer for execution and processing. Examples of suitable non-transitory storage media include a floppy disk, hard disk, optical disk, magneto-optical disk, CD-ROM, CD-ft magnetic tape, non-volatile memory card, ROM, DVD-ROM, Blue-ray disk, solid state disk, flash drive, and network attached storage (NAS), whether or not such devices are internal or external to the computer. A file containing information can be "stored" on computer readable medium, where "storing" means recording information such that it is accessible and retrievable at a later date by a computer. The computer-implemented method described herein can be executed using programming that can be written in one or more of any number of computer programming languages. Such languages include, for example, Java, Python, Visual Basic, and C++, as well as many others.

In some embodiments, computer readable storage media of interest include a computer program stored thereon, where the computer program when loaded on the computer includes instructions having: an algorithm for incrementally increasing the gain of the detector such that the detector collects light from particles in a flow stream at each of a plurality of successively increasing gains, obtaining a baseline noise level from the detector at each gain in the plurality of successively increasing gains, calculating a limit of detection (LoD) for each gain in the plurality of successively increasing gains, and assessing the calculated LoDs to determine an ideal gain. Instructions of interest are configured to calculate each LoD based on the gain and the baseline noise level.

Computer-Controlled Systems

Aspects of the present disclosure further include computer-controlled systems, where the systems include one or more computers for complete automation or partial automation. In some embodiments, systems include a computer having a non-transitory computer readable storage medium with a computer program stored thereon, where the computer program when loaded on the computer includes instructions for incrementally increasing the gain of the detector such that the detector collects light from particles in a flow stream at each of a plurality of successively increasing gains, obtaining a baseline noise level from the detector at each gain in the plurality of successively increasing gains, calculating a limit of detection (LoD) for each gain in the plurality of successively increasing gains, and assessing the calculated LoDs to determine an ideal gain. Instructions of interest are configured to calculate each LoD based on the gain and the baseline noise level. Instructions of interest are configured to calculate each LoD based on the gain and the baseline noise level.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor, or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, Python, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, or a diskette drive. Such types of memory storage devices typically read from, and/or write to, a program storage medium (not shown) such as a compact disk. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, Wi-Fi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, a USB-C port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or Wi-Fi connection to the internet at a Wi-Fi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a workstation, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows® NT®, Windows® XP, Windows® 7, Windows® 8, Windows® 10, iOS®, macOS®, Linux®, Ubuntu®, Fedora®, OS/400®, i5/OS®, IBM i®, Android™, SGI IRIX®, Oracle Solaris® and others.

Figure 6:
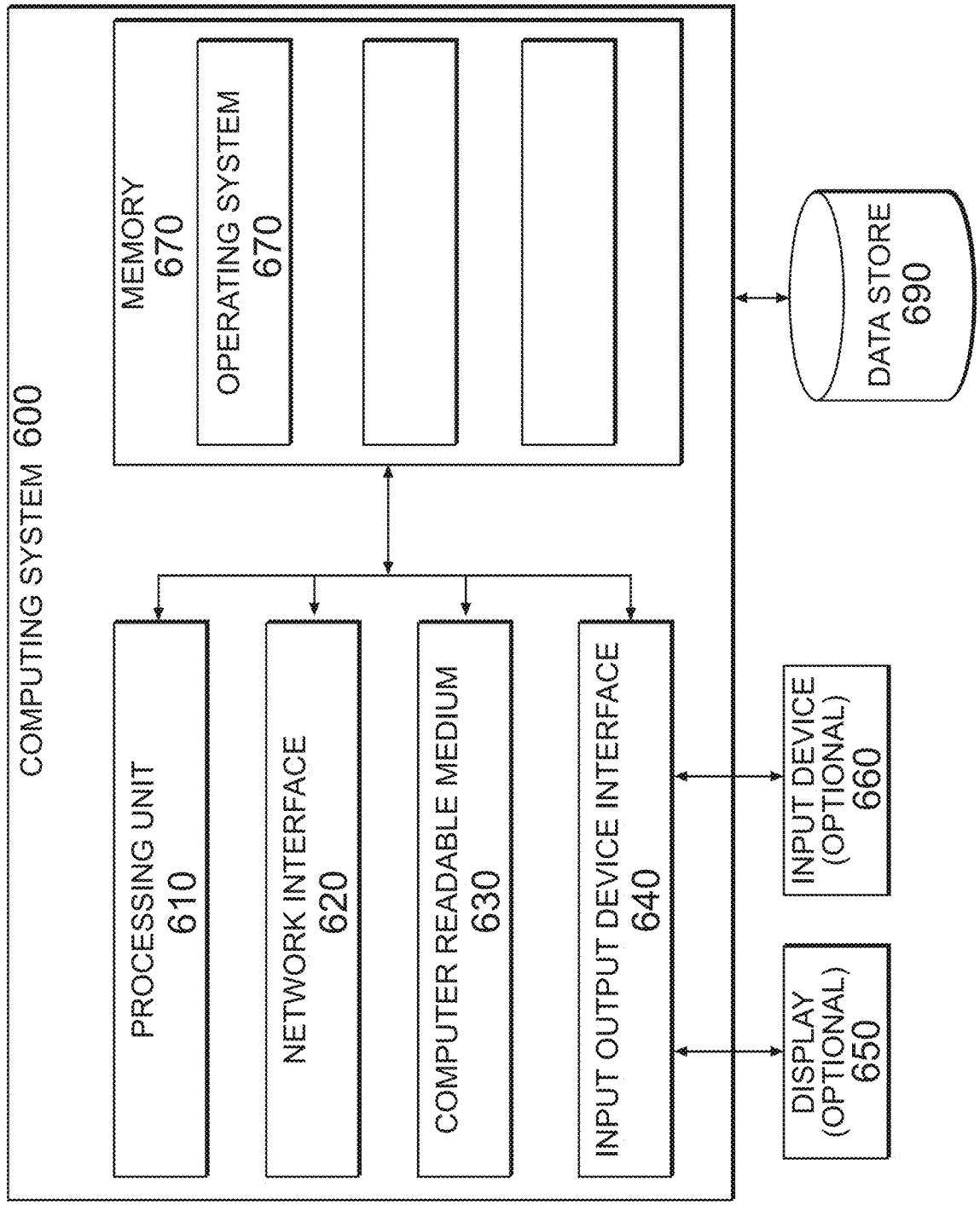
FIG. 6 depicts a block diagram of a computing system according to certain embodiments.

FIG. 6 depicts a general architecture of an example computing device 600 according to certain embodiments. The general architecture of the computing device 600 depicted in FIG. 6 includes an arrangement of computer hardware and software components. It is not necessary, however, that all of these generally conventional elements be shown in order to provide an enabling disclosure. As illustrated, the computing device 600 includes a processing unit 610, a network interface 620, a computer readable medium drive 630, an input/output device interface 640, a display 650, and an input device 660, all of which may communicate with one another by way of a communication bus. The network interface 620 may provide connectivity to one or more networks or computing systems. The processing unit 610 may thus receive information and instructions from other computing systems or services via a network. The processing unit 610 may also communicate to and from memory 670 and further provide output information for an optional display 650 via the input/output device interface 640. For example, an analysis software (e.g., data analysis software or program such as FlowJo®) stored as executable instructions in the non-transitory memory of the analysis system can display the flow cytometry event data to a user. The input/output device interface 640 may also accept input from the optional input device 660, such as a keyboard, mouse, digital pen, microphone, touch screen, gesture recognition system, voice recognition system, gamepad, accelerometer, gyroscope, or other input device.

The memory 670 may contain computer program instructions (grouped as modules or components in some embodiments) that the processing unit 610 executes in order to implement one or more embodiments. The memory 670 generally includes RAM, ROM and/or other persistent, auxiliary or non-transitory computer-readable media. The memory 670 may store an operating system 672 that provides computer program instructions for use by the processing unit 610 in the general administration and operation of the computing device 600. Data may be stored in data storage device 690. The memory 670 may further include computer program instructions and other information for implementing aspects of the present disclosure.

Utility

The subject methods, systems and computer systems find use in a variety of applications where it is desirable to calibrate or optimize a photodetector, such as in a particle analyzer. The invention may be used where it is desirable to determine an ideal detector gain and/or reduce fluorophore spread. The subject methods and systems also find use for photodetectors that are used to analyze and sort particle components in a sample in a fluid medium, such as a biological sample. The present disclosure also finds use in flow cytometry where it is desirable to provide a flow cytometer with improved cell sorting accuracy, enhanced particle collection, reduced energy consumption, particle charging efficiency, more accurate particle charging and enhanced particle deflection during cell sorting. In embodiments, the present disclosure reduces the need for user input or manual adjustment during sample analysis with a flow cytometer. In certain embodiments, the subject methods and systems provide fully automated protocols so that adjustments to a flow cytometer during use require little, if any human input.

Embodiments of the invention find use in applications where cells prepared from a biological sample may be desired for research, laboratory testing or for use in therapy. In some embodiments, the subject methods and devices may facilitate obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems may facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Kits

Aspects of the present disclosure further include kits, where kits include storage media such as a magneto-optical disk, CD-ROM, CD-ft magnetic tape, non-volatile memory card, ROM, DVD-ROM, Blue-ray disk, solid state disk, and network attached storage (NAS). Any of these program storage media, or others now in use or that may later be developed, may be included in the subject kits. In embodiments, the program storage media include instructions for incrementally increasing the gain of a detector such that the detector collects light from particles in a flow stream at each of a plurality of successively increasing gains, obtaining a baseline noise level from the detector at each gain in the plurality of successively increasing gains, calculating a limit of detection (LoD) for each gain in the plurality of successively increasing gains, and assessing the calculated LoDs to determine an ideal gain. In embodiments, the instructions contained on computer readable media provided in the subject kits, or a portion thereof, can be implemented as software components of a software for analyzing data. In these embodiments, computer-controlled systems according to the instant disclosure may function as a software "plugin" for an existing software package.

In addition to the above components, the subject kits may further include (in some embodiments) instructions, e.g., for installing a plugin to the existing software package. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Although the foregoing invention has been described in some detail by way of illustration and example for purposes of clarity of understanding, it is readily apparent to those of ordinary skill in the art in light of the teachings of this invention that some changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A method of determining an ideal gain for a detector in a light detection system of a flow cytometer, the method comprising:
    irradiating a flow stream with light from a light source;
    setting an event rate by selecting the sensitivity with which a trigger sensor observes the presence of a particle and produces a trigger signal;
    incrementally increasing the gain of the detector such that the detector collects light from the flow stream at each of a plurality of successively increasing gains;
    obtaining a baseline noise level from the detector at each gain in the plurality of successively increasing gains;
    calculating a limit of detection (LoD) for each gain in the plurality of successively increasing gains, wherein each LoD is calculated based on:
        the gain; and
        the baseline noise level; and
    assessing the calculated LoDs to determine the ideal gain.

2. The method according to claim 1, wherein calculating the LoD comprises generating a ratio between the gain and the baseline noise level.

3. The method according to claim 2, wherein calculating the LoD comprises taking the inverse of the ratio between the gain and the baseline noise level.

4. The method according to claim 1, wherein assessing the calculated LoDs comprises producing an LoD curve comprising the LoDs calculated for each gain in the plurality of successively increasing gains.

5. The method according to claim 4, wherein assessing the calculated LoDs comprises evaluating the LoD curve for the presence of an inflection point.

6. The method according to claim 5, wherein assessing the calculated LoDs comprises identifying:
    an inflection point in the LoD curve; and
    a gain in the plurality of successively increasing gains associated with the LoD at the inflection point.

7. The method according to claim 6, further comprising determining that the gain in the plurality of successively increasing gains associated with the LoD at the inflection point is the ideal gain.

8. The method according to claim 1, wherein the flow stream comprises particles.

9. The method according to claim 8, further comprising assessing flow cytometer data associated with a plurality of different particle populations to determine the ideal gain.

10. The method according to claim 9, wherein the plurality of particle populations comprises a first particle population that is negative for a particular parameter and a second particle population that is positive for the same parameter.

11. The method according to claim 10, further comprising acquiring a first and a second signal magnitude for each of the first and second particle populations, respectively, at each gain in the plurality of successively increasing gains.

12. The method according to claim 11, wherein the method comprises estimating the first signal magnitude based on the baseline noise level obtained by the detector at each gain in the plurality of successively increasing gains.

13. The method according to claim 1 further comprising terminating the incremental gain increase following the determination of the ideal gain.

14. The method according to claim 1, further comprising setting the gain of the trigger sensor.

15. The method according to claim 1, wherein the trigger sensor is a forward-scattered light sensor.

16. The method according to claim 1, wherein the trigger sensor is an axial light loss (ALL) channel sensor.

17. The method according to claim 1, further comprising calculating a trigger window based on the trigger signal, wherein the trigger window provides a time period during which the particle is expected to pass through a detection zone of the detector.

18. The method according to claim 17, wherein the method comprises obtaining the baseline noise level at time periods that are outside of the trigger window.

19. The method according to claim 1, further comprising determining an ideal gain for a plurality of detectors.

* * * * *